(12) United States Patent
Jiang et al.

(10) Patent No.: US 12,443,804 B2
(45) Date of Patent: Oct. 14, 2025

(54) METHOD, APPARATUS AND STORAGE MEDIUM FOR TRAINING NATURAL LANGUAGE PROCESSING MODEL

(71) Applicants: Beijing BOE Technology Development Co., Ltd., Beijing (CN); BOE Technology Group Co., Ltd., Beijing (CN)

(72) Inventors: Boran Jiang, Beijing (CN); Chao Ji, Beijing (CN); Hongxiang Shen, Beijing (CN); Zhenzhong Zhang, Beijing (CN); Ge Ou, Beijing (CN); Chuqian Zhong, Beijing (CN); Shuqi Wei, Beijing (CN); Pengfei Zhang, Beijing (CN)

(73) Assignees: Beijing BOE Technology Development Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/031,511

(22) PCT Filed: Mar. 8, 2022

(86) PCT No.: PCT/CN2022/079771
§ 371 (c)(1),
(2) Date: Apr. 12, 2023

(87) PCT Pub. No.: WO2023/168601
PCT Pub. Date: Sep. 14, 2023

(65) Prior Publication Data
US 2024/0370668 A1 Nov. 7, 2024

(51) Int. Cl.
*G06F 40/58* (2020.01)

(52) U.S. Cl.
CPC .................................. *G06F 40/58* (2020.01)

(58) Field of Classification Search
CPC .......... G06F 40/58; G06F 40/30; G06F 40/20
See application file for complete search history.

(56) References Cited

U.S. PATENT DOCUMENTS

| | | |
|---|---|---|
| 2019/0122111 A1 | 4/2019 | Min et al. |
| 2020/0073933 A1 | 3/2020 | Zhao et al. |

(Continued)

FOREIGN PATENT DOCUMENTS

| | | |
|---|---|---|
| CN | 111062209 A | 4/2020 |
| CN | 111581395 A | 8/2020 |

(Continued)

OTHER PUBLICATIONS

PCT/CN2022/079771 international search report.
(Continued)

*Primary Examiner* — Darioush Agahi
(74) *Attorney, Agent, or Firm* — IPro, PLLC

(57) ABSTRACT

The present disclosure relates to a method for training a natural language processing model, including: obtaining a sample text of natural language; determining one or more triples in the sample text, wherein each of the triples comprises two entities in the sample text and a relation between the two entities; processing the sample text based on the triples to obtain one or more knowledge fusion vectors; and training a natural language processing model by inputting the knowledge fusion vectors into the natural language processing model to obtain a target model.

19 Claims, 19 Drawing Sheets

(56) References Cited

U.S. PATENT DOCUMENTS

| | | | |
|---|---|---|---|
| 2021/0021621 A1 | 1/2021 | Janakiraman | |
| 2021/0142193 A1* | 5/2021 | Stepanova | G06F 16/55 |
| 2021/0365640 A1 | 11/2021 | Kang et al. | |
| 2022/0004547 A1* | 1/2022 | Lin | G06F 16/35 |
| 2024/0177047 A1* | 5/2024 | Chen | G06N 3/042 |

FOREIGN PATENT DOCUMENTS

| | | |
|---|---|---|
| CN | 111651557 A | 9/2020 |
| CN | 111753101 A | 10/2020 |
| CN | 111931520 A | 11/2020 |
| CN | 112417157 A | 2/2021 |
| CN | 112507039 A | 3/2021 |
| CN | 113111188 A | 7/2021 |
| CN | 113515943 A | 10/2021 |
| CN | 113743116 A | 12/2021 |
| CN | 113868382 A | 12/2021 |

OTHER PUBLICATIONS

PCT/CN2022/079771 Written Opinion.

Zhilin Yang, et al. "XLNet: Generalized Autoregressive Pretraining for Language Understanding", 33rd Conference on Neural Information Processing Systems (NeurIPS 2019), Vancouver, Canada, Jan. 2020.

Si Yi-chen, et al., "Chinese Named Entity Recognition Method Based on Transformer Encoder", Aug. 23, 2021.

Ming Zhou, et al. "Progress in Neural NLP Modeling, Learning, and Reasoning", Engineering 6 (2020) 275 290, 34 pages.

Ge Xuezhi. "Research of Machine Reading Comprehension Algorithm Based on Deep Learning", Jan. 2020.

Pan Xiaoxiao. "Deep Interpretation of Transformer Model", https://zhuanlan.zhihu.com/p/104393915.

Pan Xiaoxiao. "From GPT and BERT to XLNet", https://zhuanlan.zhihu.com/p/182377100.

* cited by examiner

METHOD, APPARATUS AND STORAGE MEDIUM FOR TRAINING NATURAL LANGUAGE PROCESSING MODEL

CROSS REFERENCE TO RELATED APPLICATIONS

This application is the national phase of International Application No. PCT/CN2022/079771 filed on Mar. 8, 2022, the disclosure of which is hereby incorporated by reference in its entirety.

TECHNICAL FIELD

The present disclosure relates to the field of artificial intelligence, and in particular to a method for training a natural language processing model, an apparatus for training a natural language processing model and a computer readable storage medium.

BACKGROUND

At present, natural language text itself is a sample mainly used by natural language processing (NLP) technologies when training natural language processing models. However, the natural language text itself contains relatively limited features, therefore, the processing effect of the trained natural language processing models is not very ideal.

SUMMARY

In view of this, embodiments of the present disclosure provide a method for training a natural language processing model, an apparatus for training a natural language processing model and a computer readable storage medium, so as to solve problems in the related art.

According to a first aspect of the embodiments of the present disclosure, there is provided a method for training a natural language processing model, including:
  obtaining a sample text of natural language;
  determining one or more triples in the sample text, wherein each of the triples includes two entities in the sample text and a relation between the two entities;
  processing the sample text based on the triples to obtain one or more knowledge fusion vectors; and
  training a natural language processing model by inputting the knowledge fusion vectors into the natural language processing model to obtain a target model.

Optionally, training the natural language processing model by inputting the knowledge fusion vectors into the natural language processing model to obtain the target model includes:
  constructing one or more pretraining tasks; and training the natural language processing model according to the pretraining tasks to obtain the target model.

Optionally, the pretraining tasks includes:
a first pretraining task, wherein the first pretraining task includes a masking task, and the masking task includes performing masking on the sample text based on each of the triples to obtain the knowledge fusion vectors.

Optionally, performing masking on the sample text based on each of the triples to obtain the knowledge fusion vectors includes:
  performing masking on the tokens corresponding to the triples in the sample text to obtain the knowledge fusion vector.

Optionally, performing masking on the tokens corresponding to the triples in the sample text to obtain the knowledge fusion vector includes:
  performing masking on the tokens corresponding to the entities and the relation within the triples in the sample text to obtain the knowledge fusion vector.

Optionally, performing masking on the sample text based on each of the triples to obtain the knowledge fusion vectors includes:
  dividing the sample text according to tokens corresponding to the triple to obtain a plurality of subtexts; and
  performing masking on the subtexts to obtain the knowledge fusion vector.

Optionally, dividing the sample text according to the tokens corresponding to the triple to obtain the plurality of subtexts includes:
  dividing the sample text at a beginning or an end of the tokens corresponding to the triple to obtain the plurality of subtexts.

Optionally, performing masking on the subtexts to obtain the knowledge fusion vectors includes:
  performing masking on the tokens corresponding to the triple in the subtexts to obtain the knowledge fusion vector.

Optionally, when the sample text includes n triples, dividing the sample text according to the tokens corresponding to the triple to obtain the plurality of subtexts includes:
  dividing the sample text according to tokens corresponding to a $m^{th}$ triple in the n triples to obtain the plurality of subtexts, wherein n is an integer greater than 1, m is a positive integer less than or equal to n, and m is a specified value or a random value.

Optionally, when the sample text includes n triples, dividing the sample text according to the tokens corresponding to the triple to obtain the plurality of subtexts, and performing masking on the tokens corresponding to the triples in the sample text to obtain the knowledge fusion vectors includes:
  from i=1 to i=n, iteratively performing the following steps:
  dividing the sample text according to tokens corresponding to an $i^{th}$ triple in the n triples to obtain an $i^{th}$ subtext group consisting of a plurality of subtexts corresponding to the $i^{th}$ triple; and
  performing masking on the tokens corresponding to the $i^{th}$ triple in the $i^{th}$ subtext group to obtain the knowledge fusion vectors, wherein n is an integer greater than 1 and i is a positive integer less than or equal to n.

Optionally, taking a training after performing masking on the tokens corresponding to the $i^{th}$ triple in the $i^{th}$ subtext group as an epoch of training, and performing k epochs of training, wherein k is an integer greater than or equal to n.

Optionally, determining one or more triples in the sample text includes:
  determining one or more triples corresponding to the sample text in a knowledge graph, or obtaining the triples in the sample text based on a triple extraction model.

Optionally, determining the triples corresponding to the sample text in the knowledge graph includes:
  determining a field to which the sample text belongs;
  determining the knowledge graph of the field; and
  determining the triples corresponding to the sample text in the knowledge graph of the field.

Optionally, the knowledge graph includes at least one of:
a preconstructed knowledge graph; or
a prestored knowledge graph.

Optionally, the knowledge graph includes the preconstructed knowledge graph, before determining the triples corresponding to the sample text in the knowledge graph, the method further includes:
determining the triple extraction model, wherein the triple extraction model is configured to extract the triples from the sample text; and
constructing the knowledge graph according to the extracted triples.

Optionally, the triple extraction model includes:
a label determination model configured to determine one or more labels of tokens in the sample text, wherein the labels are configured to determine entities in the sample text; and
a relation determination model configured to determine a relation between at least two entities determined by the label determination model and/or a position of the relation in the sample text.

Optionally, the label determination model includes:
a first encoding layer, wherein an input of the first encoding layer includes the tokens;
a feature extraction layer, wherein an input of the feature extraction layer includes an output of the first encoding layer;
a first activation layer, wherein an input of the first activation layer includes an output of the feature extraction layer;
a first normalization layer, wherein an input of the first normalization layer includes an output of the first activation layer; and
a first output layer, wherein an input of the first output layer includes an output of the first normalization layer and the first output layer is configured to output the labels,
wherein an input corresponding to a $(i+1)^{th}$ token in the sample text at the first activation layer further includes an output corresponding to an $i^{th}$ token in the sample text at the first output layer, and i is an integer greater than or equal to 1.

Optionally, the relation determination model includes:
a second encoding layer, wherein an input of the second encoding layer includes one or more span entities;
a fully connected layer, wherein an input of the fully connected layer includes an output of the second encoding layer and the output of the feature extraction layer;
a second activation layer, wherein an input of the second activation layer includes an output of the fully connected layer; and
a second normalization layer, wherein an input of the second normalization layer includes an output of the second activation layer and the second activation layer is configured to output the relation and/or the position of the relation in the sample text.

Optionally, determining the triples corresponding to the sample text in the knowledge graph includes:
determining a plurality of subknowledge graphs;
merging entities with the same semantics in different subknowledge graphs to obtain a merged knowledge graph; and
determining one or more triples corresponding to the sample text in the merged knowledge graph.

Optionally, merging the entities with the same semantics in different subknowledge graphs includes:
calculating one or more distances between embedding vectors corresponding to any two entities in different subknowledge graphs according to structural feature vectors $h_s$ and attribute feature vectors $h_a$ corresponding to the two entities; and if the distances are less than a distance threshold, merging the two entities.

Optionally, the structural feature vector $h_s$ and the attribute feature vector $h_a$ of each entity are calculated by using a graph convolutional network (GCN) model based on the structural feature vector $h_{s-1}$ and the attribute feature vector $h_{a-1}$ of a previous entity of the entity and a connectivity matrix A.

Optionally, the pretraining tasks further includes:
a second pretraining task configured to split a sample document into one or more segments level by level according to one or more levels of granularity, randomly arrange split segments after each level of splitting and combine rearranged samples; and perform training based on the rearranged samples to output relation types between sentences in the rearranged samples.

Optionally, the pretraining tasks further includes:
a third pretraining task configured to perform semantic recognition training after performing masking on the tokens corresponding to the triples in the sample text.

Optionally, training the natural language processing model according to the pretraining tasks to obtain the target model includes:
performing at least one epoch of following steps:
selecting and adding the pretraining tasks according to a preset order to obtain an added pretraining task; and training the natural language processing model according to the added pretraining task after each time a pretraining task is selected.

Optionally, training the natural language processing model according to the pretraining tasks to obtain the target model includes:
randomly selecting and adding the pretraining tasks to obtain an added pretraining task; and training the natural language processing model according to the added pretraining task after each time a pretraining task is selected, wherein a learning rate of training the natural language processing model is positively correlated with a batch size of samples input into the natural language processing model during each training.

Optionally, a relation between a learning rate of training the natural language processing model and a batch size of samples input into the natural language processing model during each training is as follows:

$$Y=5.57e^{-6} \cdot \log_2 X - 4.75e^{-6},$$

where X represents the batch size of samples input into the natural language processing model during each training, and Y represents the learning rate.

Optionally, the method further includes:
determining a target sample set according to one or more target training tasks; and
training an overall model according to the target sample set, wherein the overall model includes the target model and a fine-tune model.

Optionally, the fine-tune model includes at least one of:
a convolutional neural network (CNN) model;
a recurrent neural network (RNN) model;
a gated recurrent unit (GRU) model;
a fully connected (FC) layer; or
a long short-term memory (LSTM) model.

Optionally, processing the sample text based on the triples to obtain one or more knowledge fusion vectors includes:
fusing the sample text and the triples in the sample text to obtain the knowledge fusion vectors.

Optionally, fusing the sample text and the triples in the sample text to obtain the knowledge fusion vectors includes:
　　inserting the triples in the sample text into the sample text to obtain the knowledge fusion vectors.

Optionally, fusing the sample text and the triples in the sample text to obtain the knowledge fusion vectors includes:
　　determining one or more text embedding vectors corresponding to the sample text;
　　determining one or more knowledge embedding vectors corresponding to the triples; and
　　fusing the text embedding vectors and the knowledge embedding vectors to obtain the knowledge fusion vectors.

Optionally, the triples include at least one of:
　　a head entity, a relation or a tail entity.

Optionally, determining the knowledge embedding vectors corresponding to the triples includes:
　　fusing one or more embedding vectors of the head entity, one or more embedding vectors of the relation and one or more embedding vectors of the tail entity to obtain the knowledge embedding vectors:

$$e_k = \text{concat}(h_e + r_e + t_e),$$

where $e_k$ represents the knowledge embedding vectors, $h_e$ represents the embedding vectors of the head entity, $r_e$ represents the embedding vectors of the relation, $t_e$ represents the embedding vectors of the tail entity, and concat( ) represents a splicing function.

Optionally, the text embedding vectors include the text embedding vectors themselves, and further include at least one of:
　　one or more sentence embedding vectors, one or more position embedding vectors corresponding to the tokens of the triples, or one or more task type embedding vectors.

Optionally, the knowledge embedding vectors include at least one of:
　　one or more embedding vectors of one or more entities belonging to the triples; or
　　one or more embedding vectors of one or more relations belonging to the triples.

Optionally, fusing the text embedding vectors and the knowledge embedding vectors includes:
　　performing feature extraction on the text embedding vectors through one or more feature extraction layers to obtain one or more text feature vectors;
　　performing feature extraction on the knowledge embedding vectors through one or more feature extraction layers to obtain one or more knowledge feature vectors; and
　　fusing the text feature vectors and the knowledge feature vectors to obtain the knowledge fusion vectors.

Optionally, fusing the text feature vectors and the knowledge feature vectors includes:
　　fusing the text feature vectors and the knowledge feature vectors through a multi-layer perceptron layer.

Optionally, fusing the text embedding vectors and the knowledge embedding vectors includes:
　　fusing the text embedding vectors and the knowledge embedding vectors by using a knowledge fusion model:

$$f_i = \sigma(W_t^i e_t^i + W_e^i e_k^i + b_i),$$

where $f_i$ represents the knowledge fusion vectors, $e_t$ represents the text embedding vectors, $e_k$ represents the knowledge embedding vectors, $W_t$ represents a weight of the text embedding vectors, $W_e$ represents a weight of the knowledge embedding vectors, b represents a bias, and i represents the $i^{th}$ token in the corresponding sample text.

Optionally, the natural language processing model includes one or more feature extraction layers configured to:
　　perform linear transformation on the knowledge fusion vectors to obtain at least two knowledge fusion matrices including a first knowledge fusion matrix and a second knowledge fusion matrix;
　　determine an association matrix according to the first knowledge fusion matrix, wherein the association matrix is configured to represent association relation information between one or more entities in the sample text with the sample text; and
　　determine a weight matrix according to the second knowledge fusion matrix and the association matrix, wherein the weight matrix is configured to represent weight information between the entities with the sample text.

Optionally, the feature extraction layers at least include a first feature extraction layer and a second feature extraction layer, wherein a dimension of the association matrix in the second feature extraction layer is variable relative to a dimension of the weight matrix in the first feature extraction layer.

Optionally, the feature extraction layers further include one or more third feature extraction layers, wherein the third feature extraction layers include a masking matrix, and the masking matrix is configured to partially mask the association matrix.

Optionally, the third feature extraction layers are located after the first feature extraction layer.

Optionally, if a training task is a generation task, freezing the second feature extraction layer; and if the training task is a semantic understanding task, freezing the third feature extraction layers.

Optionally, the natural language processing model further includes: a split layer located before the second feature extraction layer and the third feature extraction layers, and configured to split an output of the first feature extraction layer into knowledge information and text information;
　　a first dimension conversion layer configured to change the dimension of the weight matrix obtained by the first feature extraction layer to obtain a dimension-reduced output matrix as an input of the second feature extraction layer, or to change a dimension of the knowledge information to obtain a dimension-reduced matrix as the input of the second feature extraction layer; and
　　a second dimension conversion layer located between the first feature extraction layer with the third feature extraction layers, and configured to change the dimension of the weight matrix obtained by the first feature extraction layer to obtain a dimension-reduced output matrix as an input of the third feature extraction layers, or to change a dimension of the text information to obtain a dimension-reduced matrix as the input of the third feature extraction layers.

According to a second aspect of the embodiments of the present disclosure, there is provided a text processing method, including:
　　obtaining a target text;
　　determining one or more triples in the target text, wherein each of the triples includes two entities in the target text and a relation between the two entities;
　　processing the target text based on the triples to obtain one or more knowledge fusion vectors; and inputting the knowledge fusion vectors into a target model to obtain a processing result of processing the target text.

Optionally, processing the target text based on the triples to obtain the knowledge fusion vectors includes:
fusing the target text and the triples in the target text to obtain the knowledge fusion vectors.

Optionally, inputting the knowledge fusion vectors into the target model to obtain the processing result of processing the target text includes:
inserting the triples in the target text into the target text to obtain the knowledge fusion vectors.

Optionally, inputting the knowledge fusion vectors into the target model to obtain the processing result of processing the target text includes:
determining one or more text embedding vectors corresponding to the target text;
determining one or more knowledge embedding vectors corresponding to the triples; and
fusing the text embedding vectors and the knowledge embedding vectors to obtain the knowledge fusion vectors.

Optionally, the target model includes one or more feature extraction layers configured to:
perform linear transformation on the knowledge fusion vectors to obtain at least two knowledge fusion matrices including a first knowledge fusion matrix and a second knowledge fusion matrix;
determine an association matrix according to the first knowledge fusion matrix, wherein the association matrix is configured to represent association relation information between one or more entities in the target text with the target text; and
determine a weight matrix according to the second knowledge fusion matrix and the association matrix, wherein the weight matrix is configured to represent weight information between the entities with the target text.

Optionally, the feature extraction layers at least include a first feature extraction layer and a second feature extraction layer, wherein a dimension of the association matrix in the second feature extraction layer is variable relative to a dimension of the weight matrix in the first feature extraction layer.

Optionally, the feature extraction layers further include one or more third feature extraction layers, wherein the third feature extraction layers include a masking matrix, and the masking matrix is configured to partially mask the association matrix.

According to a third aspect of the embodiments of the present disclosure, there is provided a text processing apparatus, including a processor configured to:
obtain a target text;
determine one or more triples in the target text, wherein each of the triples includes two entities in the target text and a relation between the two entities;
process the target text based on the triples to obtain one or more knowledge fusion vectors; and
input the knowledge fusion vectors into a target model to obtain a processing result of processing the target text.

Optionally, the apparatus further includes:
an interaction module configured to determine according an operation of a user whether the triples in the target text are obtained based on a knowledge graph, wherein
in response to determining that the triples in the target text are obtained based on the knowledge graph, determining one or more triples corresponding to the target text in the knowledge graph; and
in response to determining that the triples in the target text are not obtained based on the knowledge graph, determining one or more triples in the target text.

Optionally, the interaction module is further configured to: display the triples corresponding to the target text in the knowledge graph;
adjust the displayed triples according to the operation of the user to obtain one or more adjusted triples; and take the adjusted triples as the triples corresponding to the target text in the knowledge graph.

Optionally, the interaction module is further configured to, in response to determining that the target model is trained based on the knowledge graph, receive one or more triples input by the user as the triples corresponding to the target text in the knowledge graph.

Optionally, the interaction module is further configured to select the target model according to the operation of the user, wherein the target model includes at least one of:
a convolutional neural network (CNN), a recurrent neural network (RNN), a gated recurrent unit (GRU), a long short-term memory (LSTM), a Transformer, or a Transformer-XL.

Optionally, the target model includes the Transformer and/or the Transformer-XL, the interaction module is further configured to determine a fine-tune model according to the operation of the user.

Optionally, the fine-tune model includes at least one of: the CNN, the RNN, the GRU or the LSTM.

According to a fourth aspect of the embodiments of the present disclosure, there is provided a computer readable storage medium storing computer programs thereon, where, when the computer programs are executed by one or more processors, the processors are configured to implement the steps of the method for training the natural language processing model and/or the steps of the text processing method.

According to the embodiments of the present disclosure, the sample text can be processed based on the triples in the sample text to obtain the knowledge fusion vectors. Compared with the sample text, the knowledge fusion vectors can include other knowledge information besides the sample text itself, for example, entity information and relation information between the entities in the text, so that the computer can obtain the true meaning of the sample text more accurately. Therefore, the target model obtained by training the natural language processing model based on the knowledge fusion vectors is better for natural language processing.

BRIEF DESCRIPTION OF THE DRAWINGS

In order to explain the technical solutions more clearly in the embodiments of the present disclosure, the drawings required for the description of the embodiments will be briefly introduced below. It is obvious that the drawings in the following description are only some embodiments of the present disclosure. For those of ordinary skill in the art, other drawings can also be obtained based on these drawings, without paying any creative labor.

DETAILED DESCRIPTION OF THE EMBODIMENTS

The technical solutions in the embodiments of the present disclosure will be described clearly and completely below in combination with the drawings in the embodiments of the present disclosure. Obviously, the described embodiments are only part of the embodiments of the present disclosure, not all of them. Based on the embodiments in the disclosure, all other embodiments obtained by ordinary technicians in the art without doing creative work belong to the scope of the disclosure.

Figure 1:
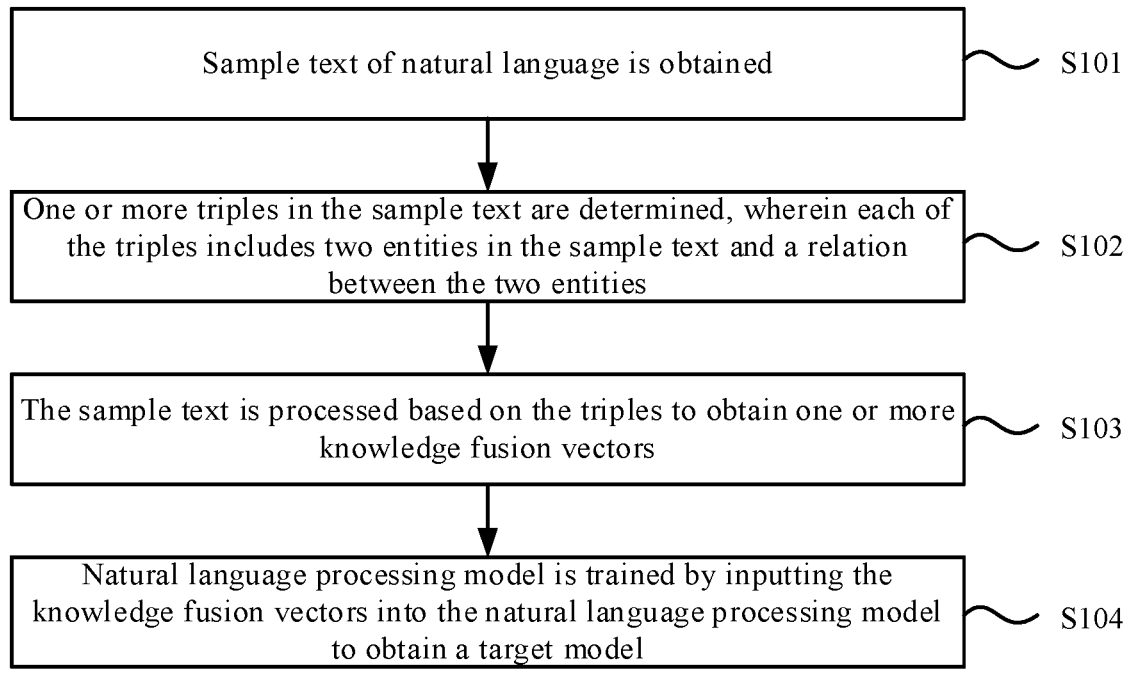
FIG. 1 is a schematic flowchart illustrating a method for training a natural language processing model according to an embodiment of the present disclosure.

FIG. 1 is a schematic flowchart illustrating a method for training a natural language processing model according to an embodiment of the present disclosure. The method for training the natural language processing model shown in the embodiment can be applied to both terminals and servers, wherein the terminals can include, but not limited to, electronic devices such as mobile phones, tablet computers, wearable devices and personal computers, and the servers can include, but not limited to, local servers and cloud servers.

As shown in FIG. 1, the method for training the natural language processing model can include the following steps:
  in step S101, a sample text of natural language is obtained;
  in step S102, one or more triples in the sample text are determined, wherein each of the triples includes two entities in the sample text and a relation between the two entities;
  in step S103, the sample text is processed based on the triples to obtain one or more knowledge fusion vectors;
  in step S104, a natural language processing model is trained by inputting the knowledge fusion vectors into the natural language processing model to obtain a target model.

It should be noted that "entities" in the embodiment of the present disclosure refer to something that is distinguishable and independent. For example, a person, a city, a plant, a commodity, and the like. Everything in the world is composed of concrete objects, which refer to entities, such as "United States" and "Britain". The entities can exist in a knowledge graph, for example, as the most basic element in the knowledge graph, or the entities can also exist without the knowledge graph, and different entities can have different relations. The "relations" in the embodiment of the present disclosure refer to an association between different entities, for example, the association between London and Britain is a capital. In addition, the "relations" can also refer to attributes, for example, age, height and weight of a person.

The "knowledge graph" appearing in subsequent embodiments is intended to describe various entities or concepts existing in the real world and relations between the entities or concepts. The "knowledge graph" can form a huge semantic network diagram, with nodes representing the entities or concepts and edges consisting of the attributes or relations. At present, the knowledge graph has been used to refer to various large-scale knowledge bases.

In one embodiment, each of the triples can include two entities and a relation between the two entities, and the two entities can include a head entity and a tail entity. For example, the sample text is "Levi's is a civil servant of a country A", wherein the head entity includes "Levi's", the tail entity includes "a civil servant of a country A", and the relation includes a "managerial position". It should be noted that the relation in the triple described in the embodiment of the present disclosure can include the relation itself, and can further include attributes of the entities. Mainly taking that the relation only includes the relation itself as an example to describe in the embodiment of the present disclosure.

It can be seen that the entities in the triples exist in the sample text, while the relations in the triples may not exist in the sample text. Certainly, this is only an example, and in some cases, the relations in the triples may also exist in the sample text.

In one embodiment, there can be not only one triple, but also multiple triples in a sample text, wherein the sample text includes at least one of a sentence, multiple sentences, a paragraph or an article. Hereinafter, mainly taking that the sample text includes one sentence as an example to describe.

For example, a sample text is "after the Civil Change, Yu Qian became an outstanding national hero in the Ming Dynasty".

It can be determined that in the sample text, a head entity (Subject, SUBJ) includes "Yu Qian", a tail entity (Object, OBJ) includes "Ming Dynasty", and a relation includes "dynasty".

In the sample text, there is only one triple, that is, [["Yu Qian", "dynasty", "Ming Dynasty"]].

For example, a sample text is "Song Yingxing was from Fengxin, Jiangxi, born in 1587 AD and experienced the last period from corruption to extinction in the Ming Dynasty".

It can be determined that in the sample text, a head entity (Subject, SUBJ) includes "Song Yingxing", a tail entity (Object, OBJ) includes "Fengxin, Jiangxi" and "1587", and a relation includes "place of birth" and "date of birth".

In the sample text, there are two triples, one is [["Song Yingxing", "place of birth", "Fengxin, Jiangxi"], and the other is [["Song Yingxing", "date of birth", "1587"]].

In addition, the sample text can include, but not limited to, Chinese, and can also be a foreign language such as English, and thus the triples in the sample text can also be English.

According to the embodiment of the present disclosure, the sample text can be processed based on the triples in the sample text to obtain the knowledge fusion vectors. Since the triples in the sample text not only include the original features of the entities in the triples in the sample text, but also include the features of the relations in the triples, the obtained knowledge fusion vectors can also include the features of the relations in the triples, wherein the extraction of the entities can mine the core meaning of the sample text. Further, the relations can fully reflect the relations between the entities in the sample text, therefore, by extracting the features of the entities and/or the relations, the model can better obtain the parameters that reflect the meaning of the sample text in the subsequent training process of the model. Therefore, compared with the sample text, the knowledge fusion vectors include other knowledge information besides the sample text itself, for example, entity information and relation information between the entities in the text, so that the computer can obtain the true meaning of the sample text more accurately. Therefore, the target model obtained by training the natural language processing model based on the knowledge fusion vectors is better for natural language processing.

In one embodiment, the natural language processing model can include, but not limited to, any of the following models: a self-attention mechanism model, a multi-layer perceptron (MLP) model, a recurrent neural network (RNN) model, a convolutional neural network (CNN) model, a deep convolutional neural network (DCNN) model and a self-attention transformer.

Figure 2:
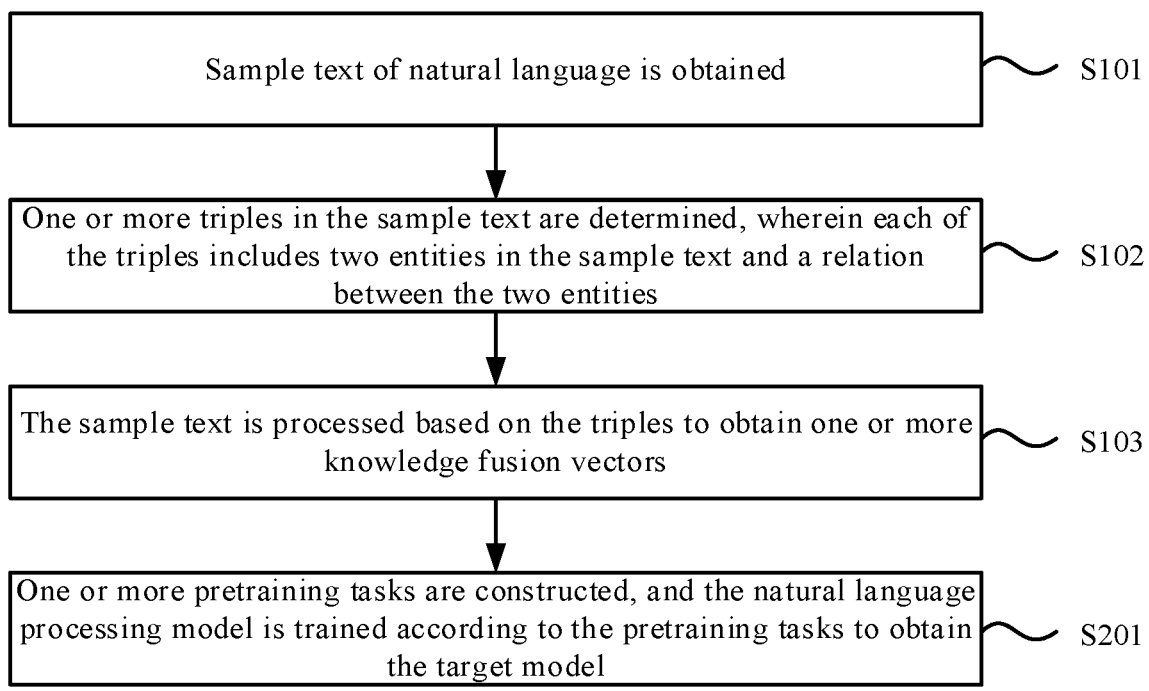
FIG. 2 is a schematic flowchart illustrating a method for training a natural language processing model according to an embodiment of the present disclosure.

FIG. 2 is a schematic flowchart illustrating a method for training a natural language processing model according to an embodiment of the present disclosure. As shown in FIG. 2, training the natural language processing model by inputting the knowledge fusion vectors into the natural language processing model to obtain the target model includes:

in step S201, one or more pretraining tasks are constructed, and the natural language processing model is trained according to the pretraining tasks to obtain the target model.

In one embodiment, a model of an actual application can be called an overall model, and the overall model can include the target model, and can also include a fine-tune model. The target model can be obtained in a pretraining stage, and the fine-tune model can be obtained in a subsequent fine-tune stage.

In the pretraining stage, embedding vectors obtained from the sample text can be input into the natural language processing model and trained according to the constructed pretraining tasks; further, parameters of the natural language processing model can be adjusted according to a difference between an output of the natural language processing model and a correct result corresponding to an input in the training stage and/or the pretraining tasks, to make a difference between a processing result of the natural language processing model and a corresponding correct result smaller and smaller, and finally within a certain threshold, therefore, it can be considered that the training of natural language processing model is completed based on the pretraining tasks.

When there are multiple pretraining tasks, the natural language processing model can be trained one by one according to each of the multiple pretraining tasks, or the natural language processing model can be trained together based on the multiple pretraining tasks, which can be selected as required. In the pretraining stage, the target model can be obtained after training the natural language processing model, that is, the target model can be stripped off. The trained target model can provide features for different downstream tasks, or other downstream tasks can be fine-tuned directly on the trained target model.

In another embodiment, the target model obtained based on the pretraining tasks can also be used as the model of the actual application.

In the following embodiments, the pretraining stage is described first; and then the fine-tune stage will be described in the subsequent embodiments.

The training of the natural language processing model can be based on the pretraining tasks. Specifically, the pretraining tasks can be set as required, and a number of the pretraining tasks can also be set as required, for example, the number of the pretraining tasks can be one or more.

In one embodiment, one or more pretraining tasks include:
  a first pretraining task, wherein the first pretraining task includes a masking task, and the masking task includes performing masking on the sample text based on each of the triples to obtain the knowledge fusion vectors.

The masking task can be understood as performing masking on one or more tokens in the sample text (replacing the tokens with "[mask]") to obtain the knowledge fusion vectors, and performing a prediction training in the pretraining task (that is, performing, by the model, the prediction on the masked tokens according to unmasked tokens (a context)) to finally obtain one or more trained text vectors, therefore, vectors corresponding to the position of the mask in the trained text vectors can indicate that the meanings of the tokens and the context are fused, that is, the meaning of the text can be expressed more accurately.

In one embodiment, the first pretraining task can be a task of performing masking on the sample text based on each of the triples. It can be understood that when performing a masking processing on the sample text, knowledge information (that is, the triples) is introduced, therefore, the more targeted masking processing is performed, and the trained knowledge fusion vectors are more accurate. Performing masking on the sample text based on each of the triples includes at least two situations. 1) Masking is performed on all or part of the tokens corresponding to the triples in the sample text. The triples in the sample text are usually key information, and thus it is better to predict the triples. A proportion of tokens to be masked in all tokens in the sample text can be set as required, for example, 10% to 20%, where the proportion can be set to 15%. If the number of the triples is greater than the proportion, masking can be performed on only some triples; and if the number of the triples is less than the proportion, masking can be performed on other tokens in the sample text at the same time. 2) The sample text is divided into a plurality of subtexts based on the triples, and masking is performed on the plurality of subtexts respectively. The masked tokens have some randomness, by performing segmentation on the text based on the triples, masking can be performed on each part of the text, thereby making the masking more uniform and improving the prediction effect. The above two situations can be implemented separately or simultaneously, and the embodiment of the present disclosure is not limited to this.

In one embodiment, processing the sample text based on the triples to obtain one or more knowledge fusion vectors can include: performing masking on the tokens in the sample text to obtain the knowledge fusion vectors; and training the natural language processing model by inputting the knowledge fusion vectors into the natural language processing model to obtain the target model can include: training the natural language model to predict the masked tokens, wherein the trained target model can output trained knowledge fusion vectors. In this case, the obtained knowledge fusion vectors can include embedding vectors of the tokens, and further, embedding vectors of the whole sample text can also be obtained.

For example, masking can be performed on the tokens corresponding to the triples in the sample text to obtain the knowledge fusion vector; that is, after performing masking on the tokens corresponding to the entities and/or the relation between the entities within the triples in the sample text. In this case, the obtained knowledge fusion vector can include embedding vectors of the tokens corresponding to the triple, and can also include embedding vectors corresponding to tokens other than the triple, and further, the embedding vectors of the whole sample text can also be obtained.

The target model trained based on the first pretraining task at least can be used to output embedding vectors of the masked tokens, and can also be used to output embedding vectors of the unmasked tokens, and further, the embedding vectors of the whole sample text can also be obtained.

In one embodiment, performing masking on the sample text based on each of the triples to obtain the knowledge fusion vectors includes:
  performing masking on the tokens corresponding to the triples in the sample text to obtain the knowledge fusion vector. The tokens of the triples can be tokens corresponding to the entities, or can be tokens corresponding to the relation, or even can be tokens corresponding to the entities and the relation.

In one embodiment, performing masking on the tokens corresponding to the triples in the sample text to obtain the knowledge fusion vector includes:
  performing masking on the tokens corresponding to the entities and the relation within the triples in the sample text to obtain the knowledge fusion vector.

The performing masking on the tokens corresponding to the triples in the sample text to obtain the knowledge fusion vector means that masking can only be performed on the tokens corresponding to the entities within the triples in the sample text to obtain the knowledge fusion vector, that is, embedding vectors corresponding to the entities can be obtained; or masking can be performed on the tokens corresponding to the entities and the relation between the entities within the triples in the sample text to obtain the knowledge fusion vectors, that is, embedding vectors corresponding to the entities and embedding vectors corresponding to the relation can be obtained, and embedding vectors of the whole triple can also be obtained.

Specifically, whether to perform masking on the entities in the triples to obtain the knowledge fusion vectors or to perform masking on the entities and the relations to obtain the knowledge fusion vectors can be selected as required. In one embodiment, performing masking on the sample text based on each of the triples to obtain the knowledge fusion vectors includes:
  dividing the sample text according to tokens corresponding to the triple to obtain a plurality of subtexts; and performing masking on the subtexts to obtain the knowledge fusion vectors.

In one embodiment, dividing the sample text according to the tokens corresponding to the triple to obtain the plurality of subtexts includes:
  dividing the sample text at a beginning or an end of the tokens corresponding to the triple to obtain the plurality of subtexts.

In one embodiment, performing masking on the subtexts to obtain the knowledge fusion vectors includes:
  performing masking on the tokens corresponding to the triple in the subtexts to obtain the knowledge fusion vector.

In one embodiment, since the diversity of the sample text, the triples in the sample text can be evenly distributed in the sample text. In this case, masking can be performed on the tokens in the sample text directly to obtain the knowledge fusion vectors, and the trained target model can relatively accurately determine the features of each part of the sample text, thereby realizing the relatively accurate prediction.

However, in some cases, the triples in the sample text are not evenly distributed in the sample text, but concentrated in a certain part of the sample text. For example, the sample text includes 30 words, and the triples only exist in the first 20 words of the 30 words, when performing masking on the tokens corresponding to the triple in the subtexts to obtain the knowledge fusion vector, the prediction training is mainly performed based on the features of tokens near the masked tokens. Therefore, the features of the first 20 words in the sample text can be relatively accurately determined by the obtained target model, however, the features of the last 10 words in the sample text cannot be relatively accurately determined, that is, the features of the last 10 words are relatively inaccurate. In this case, the accuracy of the prediction based on the target model will also be relatively low.

Therefore, in the embodiment, before performing the prediction training, the sample text can be divided according to tokens corresponding to each of the triples. For example, for a sample text including one triple, the tokens corresponding to the triple can be divided once along the tokens in the sample text from front to back to obtain two subtexts after the once division. For example, for a sample text including multiple triples, for each of the multiple triples, the tokens corresponding to the triple can be divided once along the tokens in the sample text from front to back, such that subtexts corresponding to each of the multiple divisions can be obtained. Two subtexts can be obtained by each of the multiple divisions, and thus the multiple subtexts can be obtained. Compared with tokens corresponding to the triples in the sample text before division, tokens corresponding to the triples in the subtexts can be distributed more evenly.

It should be noted that since the triples include the head entity, the tail entity and the relation, the sample text can be divided once when the tokens corresponding to the head entity are determined, or can be divided once when the tokens corresponding to the relation are determined, or can also be divided once when the tokens corresponding to the tail entity are determined. In this case, two subtexts can be obtained by one division.

Further, the sample text can be divided many times. For example, the sample text can be divided once when the tokens corresponding to one of the head entity, the tail entity and the relation are determined, when the relation is not included in the sample text, the sample text can be divided into three subtexts (that is, the head entity and the tail entity are used as a dividing boundary respectively); and when the relation is included, the sample text can be divided into four subtexts (that is, the head entity, the tail entity and the relation are used as the dividing boundary respectively).

In addition, when dividing the sample text, the sample text can be divided at a beginning of the tokens corresponding to the triple, or can be divided at an end of the tokens corresponding to the triple.

In the following embodiments, mainly taking that the sample text is divided once and the sample text is divided at the end of the tokens corresponding to the triple as an example to describe.

For example, in the example of the above sample text with 30 words, the head entities in the triples are the $9^{th}$ word and the $10^{th}$ word, the tail entities in the triples are the $18^{th}$ word and the $19^{th}$ word, and then the sample text can be divided once at the end of the $10^{th}$ word, that is, the first subtext consists of the $1^{st}$ word to the $10^{th}$ word, and the second subtext consists of the $1^{th}$ word to the $30^{th}$ word. The sample text can also be divided into multiple segments, for example, the $11^{th}$ word to the $30^{th}$ word can be further divided into the $11^{th}$ word to the $20^{th}$ word and $21^{st}$ word to $30^{th}$ word.

Since the number of words in the first subtext is relatively small, although the head entities are located at the end of the first subtext, the distribution of the tokens corresponding to the triple in the first subtext is still relatively uniform. However, in the second subtext, the tail entities are located in the $8^{th}$ word and the $9^{th}$ word of 20 words, that is, in the middle of the sample text, therefore, the distribution is relatively uniform.

For example, the sample text is "after the Civil Change, Yu Qian became an outstanding national hero in the Ming Dynasty". The triples in the sample text is [["Yu Qian", "dynasty", "Ming Dynasty"]], and thus the sample text can be divided according to the two entities "Yu Qian" and "Ming Dynasty" to obtain the first subtext "after the Civil Change, . . . in the Ming Dynasty" and the second subtext "Yu Qian became an outstanding national hero".

It can be seen that in the two subtexts, the tokens "Yu Qian" and "Ming Dynasty" corresponding to the entities have been relatively uniform respectively. On this basis, masking is performed on the tokens corresponding to the triple in the subtext to obtain the knowledge fusion vector, and the trained target model can relatively accurately determine the features of each part of the sample text before division, thereby realizing the relatively accurate prediction.

In one embodiment, the sample text includes n (n is a positive integer) triples, dividing the sample text according to the tokens corresponding to the triple to obtain the plurality of subtexts, and performing masking on the tokens corresponding to the triples in the sample text to obtain the knowledge fusion vector includes:

from i=1 to i=n, iteratively performing the following steps:

dividing the sample text according to tokens corresponding to an $i^{th}$ triple in the n triples to obtain an $i^{th}$ subtext group consisting of a plurality of subtexts corresponding to the $i^{th}$ triple; and performing masking on the tokens corresponding to the $i^{th}$ triple in the $i^{th}$ subtext group to obtain the knowledge fusion vectors, where n is an integer greater than 1 and i is a positive integer less than or equal to n.

When the sample text includes one triple, the sample text can be divided; and when the sample text includes multiple triples, for example, n triples, the sample text can also be divided. For each of the multiple triples, the tokens corresponding to the triple can be divided once at the end of the first token corresponding to the sample text along the tokens in the sample text from front to back, such that subtexts corresponding to each of the multiple divisions can be obtained, and two subtexts can be obtained by each of the multiple divisions.

For example, the sample text is "Song Yingxing was from Fengxin, Jiangxi, born in 1587 AD and experienced the last period from corruption to extinction in the Ming Dynasty".

It can be determined that in the sample text, the head entity (Subject, SUBJ) includes "Song Yingxing", the tail entity (Object, OBJ) includes "Fengxin, Jiangxi" and "1587", and the relation includes "place of birth" and "date of birth".

In the sample text, there are two triples, one is [["Song Yingxing", "place of birth", "Fengxin, Jiangxi"], and the other is [["Song Yingxing", "date of birth", "1587"]].

The sample text can be divided according to the first triple, for example, the obtained first subtext corresponding to the first triple is "Song Yingxing was from Fengxin, Jiangxi", and the second subtext is "born in 1587 AD and experienced the last period from corruption to extinction in the Ming Dynasty".

Further, the sample text can be divided according to the second triple, for example, the obtained first subtext corresponding to the second triple is "Song Yingxing was from Fengxin, Jiangxi, born in 1587 AD", and the second subtext is "and experienced the last period from corruption to extinction in the Ming Dynasty".

It should be noted that when dividing for many times, the tokens on which the division is based can also be considered. For example, differences in the results of division according to respective triples can be ensured as far as possible. Since the head entities of the above two triples are the same, the division can be performed based on the tail entities.

After dividing, masking can be performed on the tokens corresponding to the triple in the two subtexts corresponding to the first triple to obtain the knowledge fusion vectors, that is, an epoch of training has been completed. Further, masking can be performed on the tokens corresponding to the triple in the two subtexts corresponding to the second triple to obtain the knowledge fusion vectors, that is, the next epoch of training has been completed.

In one embodiment, taking a training after performing masking on the tokens corresponding to the $i^{th}$ triple in the $i^{th}$ subtext group as an epoch of training, and performing k epochs of training, where k is an integer greater than or equal to n.

The number of epochs of training k can be greater than or equal to n, for example, if k is equal to n, from i=1 to i=n, masking is performed on the tokens corresponding to the $i^{th}$ triple in the $i^{th}$ subtext group to obtain the knowledge fusion vectors, that is, n epochs of training have been performed.

If k is greater than n, for example, k can be an integer multiple of n, steps can be performed k times:
from i=1 to i=n, masking is performed on the tokens corresponding to the $i^{th}$ triple in the $i^{th}$ subtext group to obtain the knowledge fusion vectors, that is, k epochs of training have been completed, where a value of k can be set as required.

It can be understood that masking is performed on one of the subtext groups in each epoch of training, and n epochs of training are performed, that is, masking is performed on all the subtext groups. The n epochs of training are performed means that each epoch of training will be performed n times circularly. Through this training method, all the knowledge fusion vectors obtained by dividing n subtext groups can be learned, thereby improving the accuracy of the model.

In one embodiment, when the sample text includes n triples, dividing the sample text according to the tokens corresponding to the triple to obtain the plurality of subtexts includes:
dividing the sample text according to tokens corresponding to a $m^{th}$ triple in the n triples to obtain the plurality of subtexts, where n is an integer greater than 1, m is a positive integer less than or equal to n, and m is a specified value or a random value.

For example, for the sample text in the above embodiment, there are two triples, one is [["Song Yingxing", "place of birth", "Fengxin, Jiangxi"], and the other is [["Song Yingxing", "date of birth", "1587"]]. The sample text can be divided according to one of the triples, or can also be divided according to the two triples respectively.

In one embodiment, when the sample text includes multiple triples, for example, n triples, the sample text can be divided many times according to the above embodiment, or the sample text can be divided only once as required. For example, the n triples can be labeled first (a logic of labeling can be determined as required, for example, according to a position where each triple first appears), and then the $m^{th}$ triple can be determined in the n triples; further, the sample text can be divided according to the tokens corresponding to the $m^{th}$ triple to obtain the multiple triples.

In one embodiment, performing masking on the tokens corresponding to the triples in the sample text to obtain the knowledge fusion vector includes:
performing masking on the tokens corresponding to the triples in the sample text according to a first probability (which can be less than 100%) to obtain the knowledge fusion vector.

In one embodiment, performing masking on the tokens corresponding to the triples in the sample text to obtain the knowledge fusion vector further includes:
performing masking on the tokens not corresponding to the triples in the sample text according to a second probability to obtain the knowledge fusion vectors.

In one embodiment, the first probability is greater than the second probability.

In one embodiment, the first probability has a range of 60% to 80%, for example, the first probability can be set to 80%; and/or the second probability has a range of 20% to 40%, for example, the second probability can be set to 20%; further, the sum of the first probability and the second probability is 100%.

According to the embodiment of the present disclosure, masking can be performed on the tokens corresponding to the triples in the sample text according to the first probability to obtain the knowledge fusion vector, or masking can be performed on the tokens not corresponding to the triples in the sample text according to a second probability to obtain the knowledge fusion vector. For example, the first probability is 80%, that is, there is a probability of 80% that tokens to be masked are the tokens corresponding to the triple, and there is a probability of 20% that the tokens not corresponding to the triples are selected. Therefore, it can be ensured that the trained target model can accurately predict both the tokens corresponding to the triple and the tokens not corresponding to the triple.

It should be noted that when performing masking on the tokens corresponding to the triples in the sample text, if the probability of performing masking is 100%, that is, the masked tokens are removed, markers "[mask]" are used to replace original words, and then the natural language processing model can be used to correctly predict the removed words. In the process of training, a large number of markers "[mask]" can be seen, however, in the process of actual use, these markers will not exist in the text, resulting in that the natural language processing model considers that the output is aimed at the markers "[mask]". Since these markers are invisible in actual use, some problems will be caused.

In order to avoid the above problems, in the embodiment, marking can be performed on selected tokens that need to be masked according to a preset proportion, and for other tokens that need to be masked, some of the tokens can be randomly replaced by another token, and the other part can remain unchanged. For example, the probability of performing masking is 80%, that is, only 80% of the selected tokens that need to be masked are actually replaced by the markers "[mask]"; for other tokens that need to be masked, 10% of the other tokens that need to be masked can be randomly replaced by another token, and 10% of the other tokens can remain unchanged.

Figure 3:
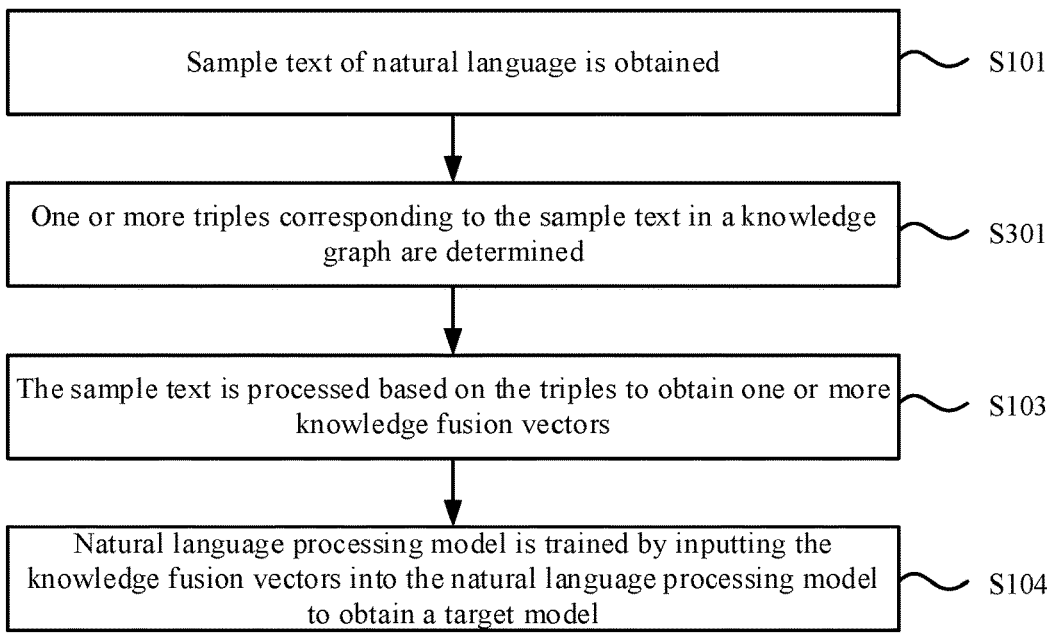
FIG. 3 is a schematic flowchart illustrating a method for training a natural language processing model according to an embodiment of the present disclosure.

FIG. 3 is a schematic flowchart illustrating a method for training a natural language processing model according to an embodiment of the present disclosure. As shown in FIG. 3, determining one or more triples in the sample text includes:
in step S301, one or more triples corresponding to the sample text in a knowledge graph (KG) are determined, or the triples in the sample text are obtained based on a triple extraction model (for example, the triple extraction model in the embodiment shown in FIG. 4).

In one embodiment, there are many methods to determine the triples in the sample text. For example, the triple extraction model can be determined first, and then the triples in the sample text can be directly obtained according to the triple extraction model. Alternatively, the triples can also be determined by combining the knowledge graph, for example, the head entities and the tail entities of the sample text can be determined, and then the corresponding relations between the head entities with the tail entities in the knowledge graph can be determined.

Since the knowledge graph includes clear entities and relations between the entities, it is possible to determine the triples corresponding to the sample text in the knowledge graph. For example, after determining the head entities and the tail entities in the triples in the sample text, the relations between the head entities with the tail entities can be determined in the knowledge graph according to the determined head entities and tail entities, which is beneficial to accurately determining the relations in the triples.

It should be noted that even if there are the relations in the triples in the sample text, since the sample text exists independently and has no connection with other texts, the relations between the entities determined based on the sample text may still be incomplete, while the knowledge graph includes a large number of entities and constructs a large number of relations between the entities, therefore, it is more comprehensive and accurate to determine the relations based on the knowledge graph.

In one embodiment, determining the triples corresponding to the sample text in the knowledge graph includes:
 determining a field to which the sample text belongs;
 determining the knowledge graph of the field; and
 determining the triples corresponding to the sample text in the knowledge graph of the field.

In one embodiment, since the same entities can express different meanings in different fields, a relation between the same entities with other entities will be very different in the knowledge graphs of different fields. For example, in the agricultural field, an entity "apple" generally refers to a kind of fruit; therefore, in the knowledge graph of the agricultural field, "apple" generally has a relation with other fruits. However, in the communication field, the entity "apple" generally refers to a mobile phone; therefore, in the knowledge graph of the communication field, "apple" generally has a relation with other mobile phones. Therefore, if the triples are determined based on the knowledge graph without distinguishing the fields, the determined triples is likely to be inaccurate.

In the embodiment, the field to which the sample text belongs can be determined first, then the knowledge graph of the field can be determined, and finally the triples corresponding to the sample text in the knowledge graph of the field can be determined. For example, the sample text belongs to the agricultural field, and then the triples corresponding to the sample text in the knowledge graph of the agricultural field can be determined. For example, the sample text belongs to the communication field, and then the triples corresponding to the sample text in the communication graph of the agricultural field can be determined. Accordingly, it is beneficial to ensure the accuracy of the determined triples.

In one embodiment, the knowledge graph includes at least one of:
 a preconstructed knowledge graph; or
 a prestored knowledge graph.

The knowledge graph used in the embodiment can be the prestored knowledge graph such as an existing knowledge graph, or the preconstructed knowledge graph. Hereinafter, how to construct a knowledge graph will be exemplarily described through several embodiments.

In one embodiment, the knowledge graph includes the preconstructed knowledge graph, before determining the triples corresponding to the sample text in the knowledge graph, the method further includes: constructing the knowledge graph. In the embodiment, the knowledge graph can be independently constructed as required, which is beneficial to ensuring that the knowledge graph where the triples are located meets the needs.

Figure 4:
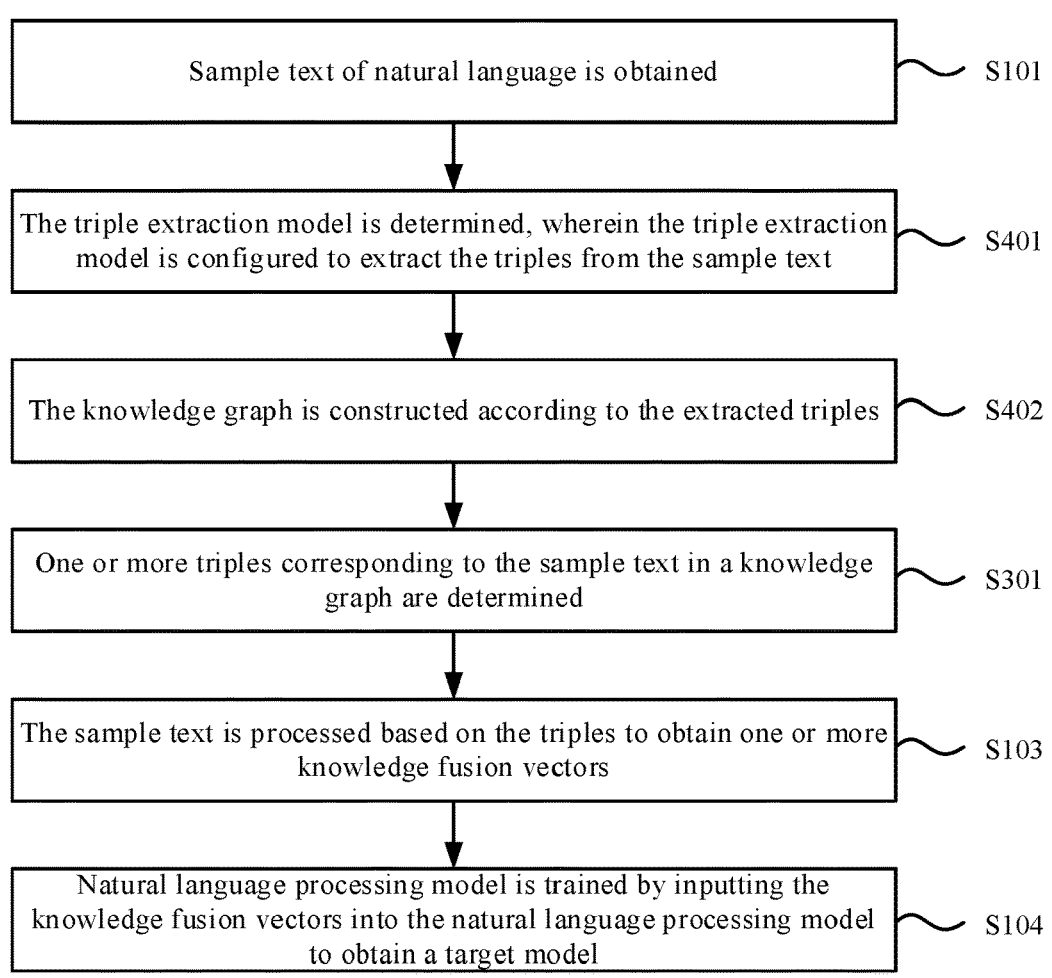
FIG. 4 is a schematic flowchart illustrating a method for training a natural language processing model according to an embodiment of the present disclosure.

FIG. 4 is a schematic flowchart illustrating a method for training a natural language processing model according to an embodiment of the present disclosure. As shown in FIG. 4, constructing the knowledge graph includes:
 in step S401, the triple extraction model is determined, wherein the triple extraction model is configured to extract the triples from the sample text;
 in step S402, the knowledge graph is constructed according to the extracted triples.

In one embodiment, since the main content of the knowledge graph is the triples, in order to construct the knowledge graph, the triple extraction model can be determined first in the embodiment, and then the triples can be extracted from a large number of sample texts through the triple extraction model, which is beneficial to improving the efficiency of extracting the triples, therefore, the knowledge graph can be constructed according to the extracted triples.

Figure 5:
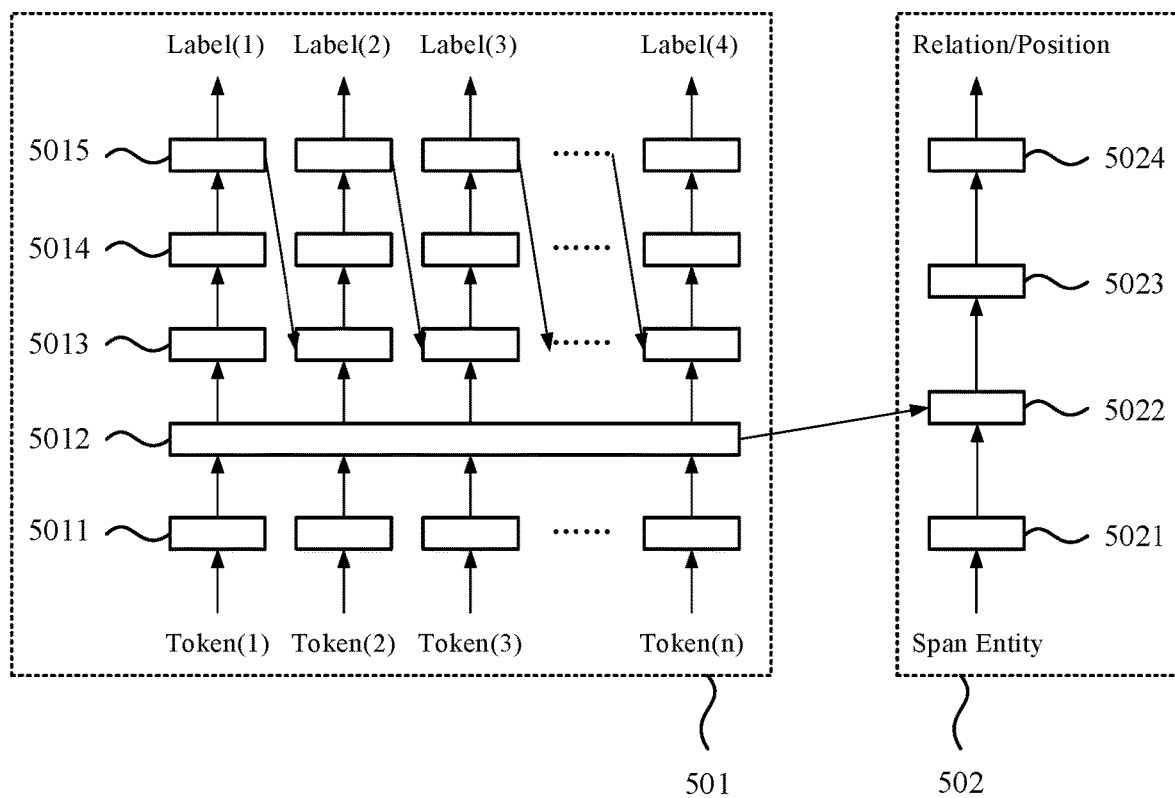
FIG. 5 is a schematic diagram illustrating a triple extraction model according to an embodiment of the present disclosure.

FIG. 5 is a schematic diagram illustrating a triple extraction model according to an embodiment of the present disclosure. As shown in FIG. 5, the triple extraction model includes:
 a label determination model 501 configured to determine one or more labels of tokens in the sample text (a division granularity may be a word or a phrase, which can be selected as required), wherein the labels are configured to determine entities in the sample text; and
 a relation determination model 502 configured to determine a relation between at least two entities (which can be called a "span entity") determined by the label determination model and/or a position of the relation in the sample text.

In one embodiment, the most basic element in the sample text may be the tokens, therefore, the entities in the triples can be determined at a granularity of the tokens in the sample text. A labeling method can be used to determine which tokens can be used as the entities in the triples. For example, based on the labeling method of BILOU (beginning, inside, outside, last, unit), the tokens in the sample text can be labeled by using labels B, I, L, O, U (the division granularity may be a word or a phrase, which can be selected as required); further, the entities in the sample text can be determined according to the labeled tokens, where the label B represents the beginning of the entities, the label I indicates the middle of the entities, the label L indicates the end of the entities, the label O indicates the non-entity tokens and the label U indicates the entity of a single word, therefore, a plurality of tokens in the sample text corresponding to the labels BIL in sequence (which can be continuous) can be determined as the entities.

Therefore, in order to accurately determine the labels of each of the tokens in the sample text, the label determination model is first constructed in the embodiment to determine the labels of the tokens in the sample text, and then the entities in the sample text can be determined based on the labels of the tokens.

However, based on the above embodiments, it can be known that the entities in the triples are generally located in the sample text, while the relations in the triples may not be located in the sample text, and even if the relations are located in the sample text, it is necessary to accurately determine the positions of the relations in the triples in the sample text, so that the relations in the triples can be accurately determined in the sample text.

Therefore, in order to determine the relations in the triples and/or the positions of the relations in the sample text, the relation determination model is also constructed in the embodiment to determine the relation between two entities in the span entity and/or the position of the relation in the sample text.

Accordingly, the triples can be accurately extracted from the sample text by using the triple extraction model. Specifically, the entities in the triples can be extracted from the sample text by using the label determination model in the triple extraction model, and relations in the triples can be extracted from the sample text by using the relation determination model in the triple extraction model.

In one embodiment, as shown in FIG. 5, the label determination model 501 includes:
- a first encoding layer 5011, wherein an input of the first encoding layer includes the tokens;
- a feature extraction layer 5012, wherein an input of the feature extraction layer includes an output of the first encoding layer;
- a first activation layer 5013, wherein an input of the first activation layer includes an output of the feature extraction layer;
- a first normalization layer 5014, wherein an input of the first normalization layer includes an output of the first activation layer; and
- a first output layer 5015, wherein an input of the first output layer includes an output of the first normalization layer and the first output layer is configured to output the labels.

In one embodiment, as shown in FIG. 5, a plurality of tokens obtained by dividing the sample text can be input into the first encoding layer, and the first encoding layer can be used to determine embedding vectors of the tokens. Optionally, the first encoding layer can include a Bert model and/or a word2vec model, and the Bert model and/or the word2vec model can extract features of a whole sentence in the sample text to obtain the embedding vectors of the tokens.

The output of the first encoding layer can be input into the feature extraction layer. The feature extraction layer can include, for example, a bi-directional long short-term memory (Bi-LSTM) model for extracting features of the embedding vectors, and the feature extraction layer can at least include the Bi-LSTM model.

The output of the feature extraction layer can be input into the first activation layer, and the first activation layer can include, for example, a Tanh layer.

The output of the first activation layer can be input into the first normalization layer, and the first normalization layer can include, for example, a softmax layer.

The output of the first normalization layer can be input into the first output layer, and the first output layer can finally output the labels corresponding to the tokens.

By using the label determination model, the labels corresponding to each token in the sample text can be determined. For example, for the sample text including n tokens, it can be determined that the label of token(1) is label(1), the label of token(2) is label(2), . . . , and the label of token(n) is label(n).

In one embodiment, as shown in FIG. 5, the input corresponding to the $(i+1)^{th}$ token in the first activation layer in the sample text further includes the output corresponding to the $i^{th}$ token in the first output layer in the sample text, where i is an integer greater than or equal to 1.

In one embodiment, if the first activation layer, the first normalization layer and the first output layer independently process each token, the label of each token can be obtained, but the accuracy of the obtained label may not be very high due to the lack of consideration of the relation between tokens. Therefore, the output of the $i^{th}$ token in the first output layer can be taken as the input of the $(i+1)^{th}$ token in the first activation layer in the embodiment, so that the label of the $(i+1)^{th}$ token can be taken into account when the label of the $i^{th}$ token is determined, which is beneficial to ensuring that the determined token meets the relation between tokens, and further improving the accuracy of determining the label.

In one embodiment, as shown in FIG. 5, the relation determination model 502 includes:
- a second encoding layer 5021, wherein an input of the second encoding layer includes one or more span entities;
- a fully connected layer 5022, wherein an input of the fully connected layer includes an output of the second encoding layer and the output of the feature extraction layer;
- a second activation layer 5023, wherein an input of the second activation layer includes an output of the fully connected layer; and
- a second normalization layer 5024, wherein an input of the second normalization layer includes an output of the second activation layer and the second activation layer is configured to output the relation and/or the position of the relation in the sample text.

In one embodiment, after determining the labels corresponding to tokens in the sample text, the entities belonging to the triples in the sample text can be further determined according to the labels; and after determining the entities, every two entities can be formed into an span entity, and the span entity can be used as the input of the relation determination model.

For example, firstly, the span entity can be input into the second encoding layer to determine the embedding vectors of the span entity.

The output of the second encoding layer can be used as the input of the fully connected layer.

The output of the fully connected layer can be input into the second activation layer, and the second activation layer can include, for example, a Tanh layer.

The output of the second activation layer can be input into the second normalization layer, and the second normalization layer can include, for example, a softmax layer.

By using the relation determination model, the relations between span entities can be determined based on the span entities input into the model. When the relations exist in the sample text, the positions of the relations in the sample text can be further determined, and then the tokens in the positions can be extracted as the relations. Accordingly, the extraction of the triples can be completed.

In one embodiment, as shown in FIG. 5, the input of the fully connected layer can further include the output of the feature extraction layer. Since the relations are determined only on the basis of the span entities, the accuracy of the obtained entities and/or the positions of the relations may be relatively low due to the lack of consideration of the contextual relations between the span entities in the sample text.

Therefore, the output of the feature extraction layer in the label determination model is taken as the input of the fully connected layer in the relation determination model in the embodiment. Since the output of the feature extraction layer can well represent the contextual relation of the entities in the span entity in the sample text, the relation determination model can also consider the contextual relation of the entities in the span entity in the sample text when determining the positions of the entities and/or the relations, which is beneficial to ensuring the accuracy of determining the positions of the entities and/or the relations.

Figure 6:
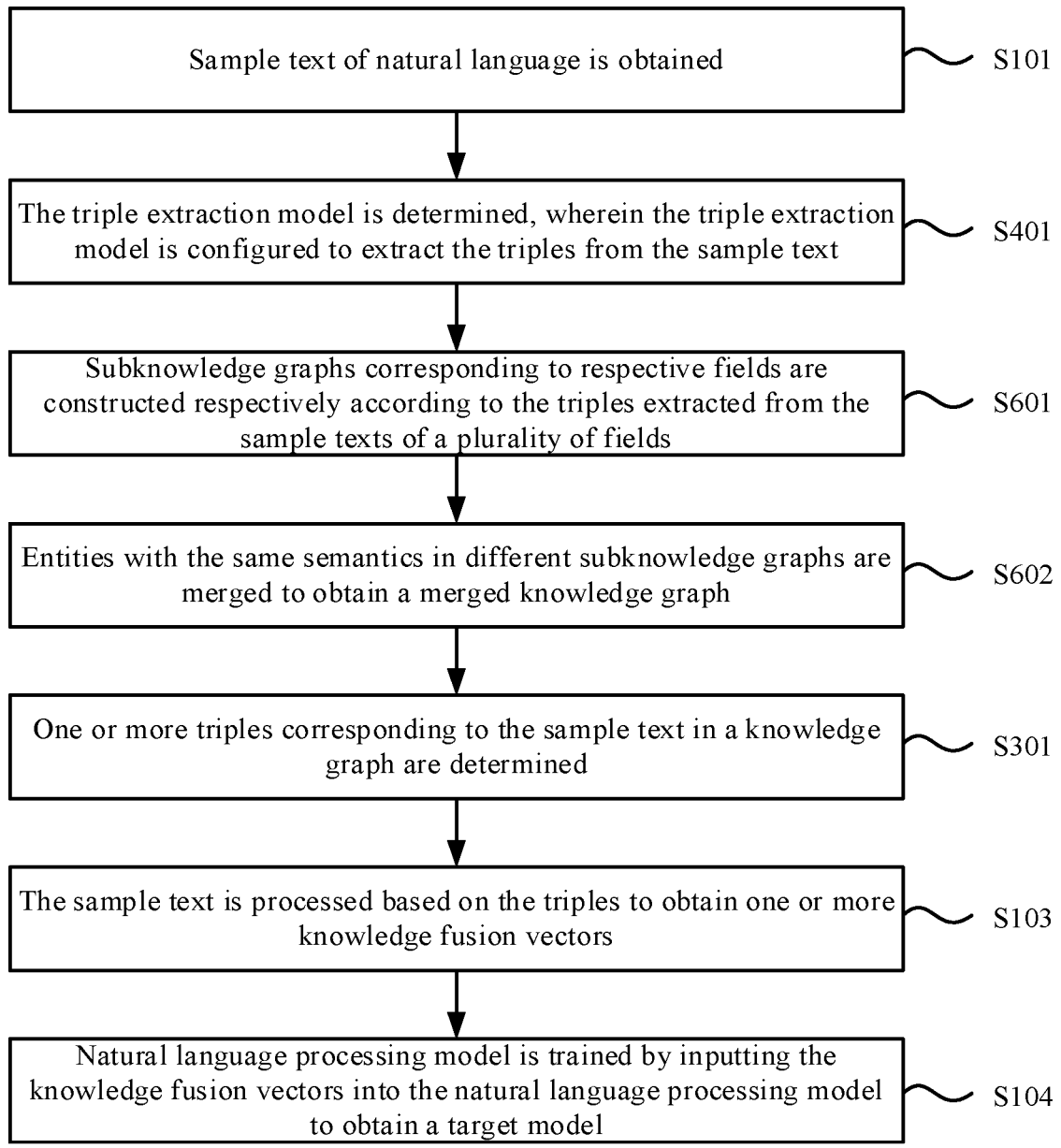
FIG. 6 is a schematic flowchart illustrating a method for training a natural language processing model according to an embodiment of the present disclosure.

FIG. 6 is a schematic flowchart illustrating a method for training a natural language processing model according to an embodiment of the present disclosure. As shown in FIG. 6, determining the triples corresponding to the sample text in the knowledge graph includes:

in step S601, a plurality of subknowledge graphs are determined;

in step S602, entities with the same semantics in different subknowledge graphs are merged to obtain a merged knowledge graph;

in step S603, one or more triples corresponding to the sample text in the merged knowledge graph are determined.

In one embodiment, since the same entities may be represented by different tokens in different knowledge graphs, for example, an entity "pineapple" can also be represented by "ananas", in this case, a triple to which the entity "pineapple" belongs and a triple to which the entity "ananas" belongs may be slightly different in different knowledge graphs. Therefore, by merging different entities with the same semantics in different knowledge graphs, on the one hand, the redundancy of entities with the same meanings expressed by different tokens can be avoided; on the other hand, it is beneficial to expand the triples to which the entities belong and ensure the comprehensiveness of the knowledge graphs. For the convenience of description, the knowledge graphs that need to be merged are called the subknowledge graphs.

For example, in a subknowledge graph KG1, there is an entity "pineapple", and a triple corresponding to the entity includes [["pineapple", "type", "fruit"]]; in a subknowledge graph KG2, there is an entity "ananas", and a triple corresponding to the entity includes [["ananas", "type", "fruit"]].

In fact, the meanings expressed by these two triples are the same. However, since the head entity is represented by different tokens with the same semantics, there is a certain degree of redundancy, resulting in that different triples are determined when determining the triples based on the tokens corresponding to the two entities "pineapple" and "ananas", and even in some cases, the triples can only be determined based on one of these two entities.

According to the embodiment, the entities with the same semantics in different subknowledge graphs can be merged to obtain the merged knowledge graph. For example, two entities "pineapple" and "ananas" respectively in KG1 and KG2 can be merged, and then the triples corresponding to the sample text in the merged knowledge graph can be determined later, therefore, no matter whether the token appears in the sample text is "pineapple" or "ananas", the same triples can be successfully determined in the merged knowledge graph.

Hereinafter, the method of merging the entities with the same semantics in the above embodiments will be described by several embodiments.

In one embodiment, merging the entities with the same semantics in different subknowledge graphs includes:

calculating one or more distances between embedding vectors corresponding to any two entities in different subknowledge graphs.

In one embodiment, for the entities in each of the subknowledge graphs, the corresponding embedding vectors can be determined. For example, the embedding vectors corresponding to the entities in the subknowledge graph can be determined in the same vector spaces to calculate a distance between the embedding vectors. When the distance between the two embedding vectors is small enough, for example, less than a distance threshold, it can be determined that the semantics of the entities corresponding to the two embedding vectors are the same, therefore, the entities corresponding to the two embedding vectors can be merged. Accordingly, the problem that the entities with the same semantics appear in different words in the merged knowledge graph, resulting in the unclear relation of the triples in the knowledge graph can be avoided; therefore, the information of the triple can be accurately extracted.

For example, an entity is represented as (A) in a knowledge graph KG1, the entity is represented as (B) in a knowledge graph KG2, the entity is represented as (C) in a knowledge graph KG3 and the entity is represented as (D) in a knowledge graph KG4; after merging, (A), (B), (C) and (D) can be merged into a list (A, B, C, D). When any item in the list appears in the sample text, the item can correspond to other items in the list. For example, (A) appears in the sample text, and the determined triples corresponding to (A) can also be used as the triples corresponding to (B), (C) and (D) in the list.

In one embodiment, calculating one or more distances between embedding vectors corresponding to any two entities in different subknowledge graphs includes:

calculating the distances according to structural feature vectors $h_s$ and attribute feature vectors $h_a$ corresponding to the two entities.

In one embodiment, for each entity in different subknowledge graphs, two feature vectors, namely, the structural feature vectors $h_s$ and the attribute feature vectors $h_a$, can be assigned (for example, the embedding vectors corresponding to the entity in the vector space include these two feature vectors); and then the distance can be calculated according to the structural feature vector $h_s$ and the attribute feature vector $h_a$, for example, based on the following formula:

$$D(e_i, v_j) = \beta \frac{f(h_s(e_i), h_s(v_j))}{d_s} + (1 + \beta) \frac{f(h_a(e_i), h_a(v_j))}{d_a},$$

where $e_i$ and $v_j$ represent two entities in different subknowledge graphs, $D(e_i, v_j)$ represents a distance between embedding vectors corresponding to the two entities, $h_s(e_i)$ represents a structural feature vector corresponding to $e_i$, $h_s(v_j)$ represents a structural feature vector corresponding to $v_j$, $h_a(e_i)$ represents an attribute feature vector corresponding to $e_i$, $h_a(v_j)$ represents an attribute feature vector corresponding to $v_j$, $d_s$ represents a dimension of the structural feature vector, $d_a$ represents a dimension of the attribute feature vector, β represents a hyper-parameter for balancing the attribute feature vector and the structural feature vector, and $f(x, y)=\|x-y\|_1$.

In one embodiment, the structural feature vector $h_s$ and the attribute feature vector $h_a$ of each entity are calculated by using a graph convolutional network (GCN) model based on the structural feature vector $h_{s-1}$ and the attribute feature vector $h_{a-1}$ of a previous entity of the entity and a connectivity matrix A. For example, it can be determined by the following formula:

$$[H_s^{(l+1)}, H_a^{(l+1)}] = \sigma\left(\hat{D}^{-\frac{1}{2}}\hat{A}\hat{D}^{-\frac{1}{2}}[H_s^{(l)}W_s^{(l)}, H_a^{(l)}W_a^{(l)}]\right),$$

where $H_s$ represents a structural feature matrix of the entity, $H_a$ represents an attribute feature matrix of the entity, $W_s^{(l)}$ represents a structural feature weight matrix of the lth layer, $W_a^{(l)}$ represents an attribute feature weight matrix of the lth layer, $\hat{A}=A+I$, where A is a connection matrix of n×n, I is an identity matrix, $\hat{D}$ is a diagonal node degree matrix of $\hat{A}$, and σ is an activation function.

In one embodiment, it can be assumed that $\alpha_{ij} \in A$ represents a propagation degree of alignment information from the $i^{th}$ entity to the $j^{th}$ entity. For each relation in the triples, two measures, which are called function and inverse function respectively, can be calculated by the following formula:

$$fun(r) = \frac{\#\text{ Head\_Entities\_of\_r}}{\#\text{ Triples\_of\_r}},$$

$$ifun(r) = \frac{\#\text{ Tail\_Entities\_of\_r}}{\#\text{ Triples\_of\_r}}.$$

In order to measure the impact of the $i^{th}$ entity on the $j^{th}$ entity, it can be calculated according to the following formula, $\alpha_{ij} \in A$:

$$a_{ij} = \sum_{\{e_i, r, e_j \in G\}} ifun(r) + \sum_{\{e_i, r, e_j \in G\}} fun(r),$$

where G represents the knowledge graph.

In one embodiment, with regard to the GCN model, the training can be performed by minimizing the following distance-based ranking loss function:

$$L_s = \sum_{(e,v) \in S} \sum_{(e',v') \in S'_{(e,v)}} [f(h_s(e), h_s(v)) + \gamma_s - f(h_s(e'), h_s(v'))]_+,$$

$$L_a = \sum_{(e,v) \in S} \sum_{(e',v') \in S'_{(e,v)}} [f(h_a(e), h_a(v)) + \gamma_a - f(h_a(e'), h_a(v'))]_+,$$

where a method of creating a negative example is to randomly select an entity from the merged two knowledge graphs to replace e and v in (e, v), both $\gamma_s$ and $\gamma_a$ are greater than 0 and represent a distance hyper-parameter for separating positive alignment from negative alignment, $L_s$ is a structural embedding loss function, $L_a$ is a feature (also called attribute) embedding loss function, $L_s$ and $L_a$ are independent of each other and can be optimized separately, for example, the above loss functions can be minimized by a stochastic gradient descent (SGD) method.

In one embodiment, the one or more pretraining tasks further includes:

a second pretraining task, wherein the second pretraining task is configured to perform rearranging training after splitting a sample document including the sample text into one or more segments.

The target model trained based on the second pretraining task can be used to determine a distance between the sample text with other texts, and then determine a relation between the sample text with other texts according to the predicted distance. For example, it can be predicted whether the sample text and other texts belong to the same document or not, and whether the sample text and other texts belong to an adjacent relation in the same document.

In one embodiment, performing the rearranging training after splitting the sample document including the sample text into the segments includes:

splitting the sample document into one or more segments level by level according to one or more levels of granularity, randomly arranging the split segments after each level of splitting and combining the rearranged samples; and performing training based on the rearranged samples to output the relation types between sentences in the rearranged samples.

In one embodiment, the relation types include at least one of:

belong to the same document and are adjacent;
belong to the same document and are not adjacent; or
belong to different documents.

For example, taking two levels of granularity as an example, for a sample document where the sample text is located, the sample document can be divided into a plurality of segments (for example, three segments [C1, C2, C3]) at a first granularity (for example, paragraphs), and then an order of the segments is randomly disrupted, for example, the segments are [C2, C1, C3] after disrupting the order; further, training is performed to restore the correct order. The segments [C1, C2, C3] can be further divided into smaller segments (for example, [S0, S1, S2, . . . , Sn]) at a second granularity (for example, sentences), wherein the second granularity is smaller than the first granularity, and then an order of the segments is randomly disrupted, for example, the segments are [S2, S9, Sn, . . . , S3] after disrupting the order; further, training is performed to restore the correct order.

Specifically, a distance between the segments can be learned based on document-level information, and this task can be a 3-classification problem. For example, if an output is 0, it is indicated that the two segments belong to the same document and are adjacent; if the output is 1, it is indicated that the two segments belong to the same document and are not adjacent; and if the output is 2, it is indicated that the two segments belong to different documents.

It should be noted that the granularity of the rearranged documents after splitting is not limited to the above two levels of granularity, and can also include a larger granularity or a smaller granularity. Taking the smaller granularity as an example, a sample text can be divided into multiple segments based on the triples, and then an order of the divided segments is disrupted; further, rearranging training is performed to restore the correct order. The method of dividing the sample text according to the triples can include, but not limited to, the method described in the above embodiment, which will not be repeated here.

In one embodiment, the one or more pretraining tasks further include:

a third pretraining task, wherein the third pretraining task is configured to perform semantic recognition training on the sample text.

The target model trained based on the third pretraining task can be used to identify the semantics of the sample text. In the embodiment of the present disclosure, the semantic recognition training of the third pretraining task can be to perform training on a relation between two sentences in a sample text. It can be understood that logical relations such as causality, progression and turning that may exist in two sentences can be trained by recognizing words such as "because", "further" and "but". In another embodiment, the semantic recognition training of the third pretraining task can be a task of inquiring about a degree of relevance to a chapter topic in the sample text. It can be understood that this task can be a multi-classification task. For example, if the output is 0, it indicates strong correlation, that is, users will continue to click on the chapter topic in the sample text after inputting the query; if the output is 1, it indicates weak correlation, that is, the users will not click on the chapter topic in the sample text after inputting the query; and if the output is 2, it indicates irrelevance, that is, randomly generated samples, the training sample may be data obtained through a search engine.

It should be noted that in addition to the above first pretraining task, the second pretraining task and the third pretraining task, one or more training tasks can also include other pretraining tasks set as required. The pretraining tasks can be supervised tasks or unsupervised tasks, and can be set according to the actual task situation. Further, the natural language processing model can be trained according to one or more pretraining tasks. When multiple pretraining tasks are used for training, the obtained target model can have multiple functions, thereby better improving the performance of the target model.

Figure 7:
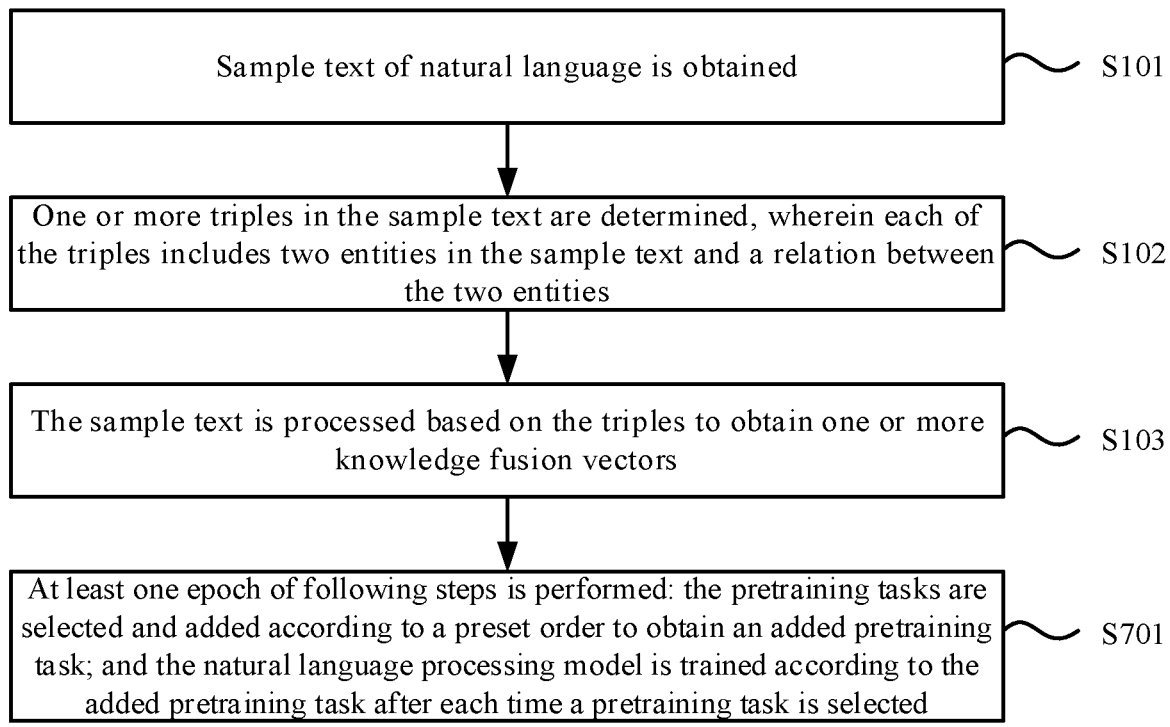
FIG. 7 is a schematic flowchart illustrating a method for training a natural language processing model according to an embodiment of the present disclosure.

FIG. 7 is a schematic flowchart illustrating a method for training a natural language processing model according to an embodiment of the present disclosure. As shown in FIG. 7, training the natural language processing model according to the pretraining tasks to obtain the target model includes:

in step S701, at least one epoch of following steps is performed:

the pretraining tasks are selected and added according to a preset order to obtain an added pretraining task; and the natural language processing model is trained according to the added pretraining task after each time a pretraining task is selected.

In one embodiment, an order of each of the pretraining tasks can be preset. For example, taking the first pretraining task Task1, the second pretraining task Task2 and the third pretraining task3 as examples, and the order of the three pretraining tasks is Task1, Task2 and Task3 from front to back.

Task1 is selected to train the natural language processing model first, and then Task2 and Task1 are added together, and training is continuously performed on the natural language processing model obtained through the previous training based on the two pretraining tasks of Task1 and Task2; further, Task3 is selected to be added with Task1 and Task2, and training is continuously performed on the natural language processing model obtained through the previous training based on the three pretraining tasks of Task1, Task2 and Task3.

Superposition means that loss functions corresponding to the pretraining tasks used in training together are superposed to form a comprehensive loss function for training. The comprehensive loss function can be obtained by directly superposing the loss functions corresponding to each of the pretraining tasks, or by superposing the loss functions corresponding to each of the pretraining tasks and averaging the superposed loss functions, or by performing weighted summation on the loss functions corresponding to each of the pretraining tasks. The embodiment of the present disclosure is not limited to this.

In this case, one epoch of training is completed. A number of training epochs can be set as required, and can also be determined according to a set cut-off condition (for example, a training result converges to a specified degree).

During each epoch of training, a number of times of training based on each added pretraining task can be flexibly adjusted. For example, a training can be performed once based on each added pretraining task, for example, a training is performed based on Task1; and then a training is performed based on the superposition of pretraining tasks Task1 and Task2; further, a training is performed based on the superposition of pretraining tasks Task1, Task2 and Task3. Alternatively, multiple trainings can be performed based on each added pretraining task, for example, two trainings are performed based on Task1, three trainings are performed based on the superposition of pretraining tasks Task1 and Task2, and four trainings are performed based on the superposition of pretraining tasks Task1, Task2 and Task3.

Figure 8:
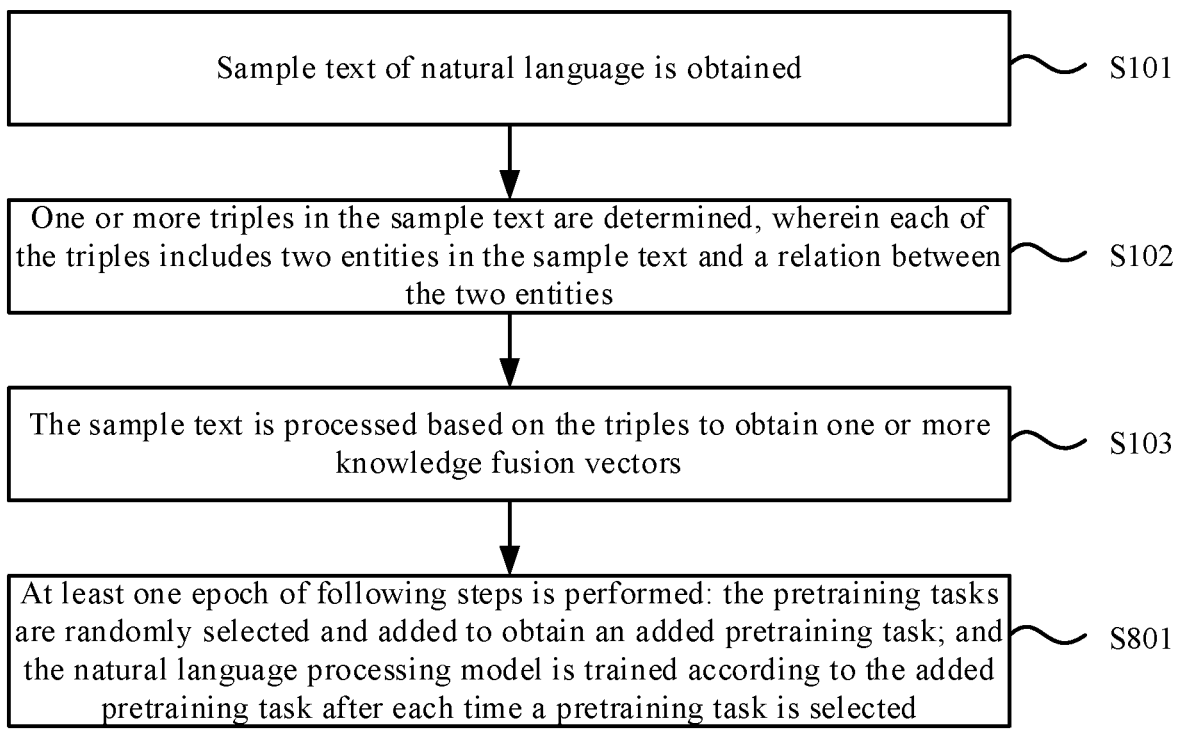
FIG. 8 is a schematic flowchart illustrating a method for training a natural language processing model according to an embodiment of the present disclosure.

FIG. 8 is a schematic flowchart illustrating a method for training a natural language processing model according to an embodiment of the present disclosure. As shown in FIG. 8, training the natural language processing model according to the pretraining tasks to obtain the target model includes:

in step S801, the pretraining tasks are randomly selected and added to obtain an added pretraining task; and the natural language processing model is trained according to the added pretraining task after each time a pretraining task is selected.

In one embodiment, an order of each of the pretraining tasks can be preset. For example, taking the first pretraining task Task1, the second pretraining task Task2 and the third pretraining task3 as examples, and the order of the three pretraining tasks is Task1, Task2 and Task3 from front to back.

Further, a pretraining task can be randomly selected from the three pretraining tasks, and a number of pretraining tasks randomly selected each time can be preset or can also be random.

For example, taking that the number of pretraining tasks randomly selected each time is preset to increase one by on as an example, if Task2 is randomly selected from three pretraining tasks, training is performed on the natural language processing model based on Task2 first; then Task2 and Task3 are randomly selected, and training is continuously performed on the natural language processing model obtained through the previous training based on the two pretraining tasks of Task2 and Task3; finally, Task3, Task1 and Task2 are randomly selected, and then training is continuously performed on the natural language processing model obtained through the previous training based on the three pretraining tasks of Task1, Task2 and Task3. The each randomly selected pretraining task may or may not include the pretraining task that has been selected. Further, randomly selected rules can be set as required, when a training result reaches a convergence condition, the training can be stopped.

With regard to the embodiments shown in FIG. 7 and FIG. 8, training tasks can be selected in order for training, or the training tasks can be selected randomly for training, which can be selected as required. In addition, a certain probability of priority selection can be made according to the importance of respective pretraining tasks of the training tasks.

In one embodiment, a learning rate of training the natural language processing model is positively correlated with a batch size of samples input into the natural language processing model during each training.

In one embodiment, a relation between the learning rate and the batch size of samples input into the natural language processing model during each training is as follows:

$$Y=5.57e^{-6}\cdot\log_2 X - 4.75e^{-6},$$

where X represents the batch size of samples input into the natural language processing model during each training, and a range of X is $24 \leq X \leq 256$; Y represents the learning rate. It should be noted that in the actual training process, a value of the calculated Y can be fine-tuned within $[Y-1.0e^{-5}, Y+1.0e^{-5}]$. By performing training based on the above relation between the batch size and the learning rate, the training of the model can converge faster. In general, a value of X is the $n^{th}$ power of 2, and the embodiment of the present disclosure is not limited to this. For values where X is not in the range of [24, 256], the learning rate can also be selected by referring to the above formula.

Figure 9:
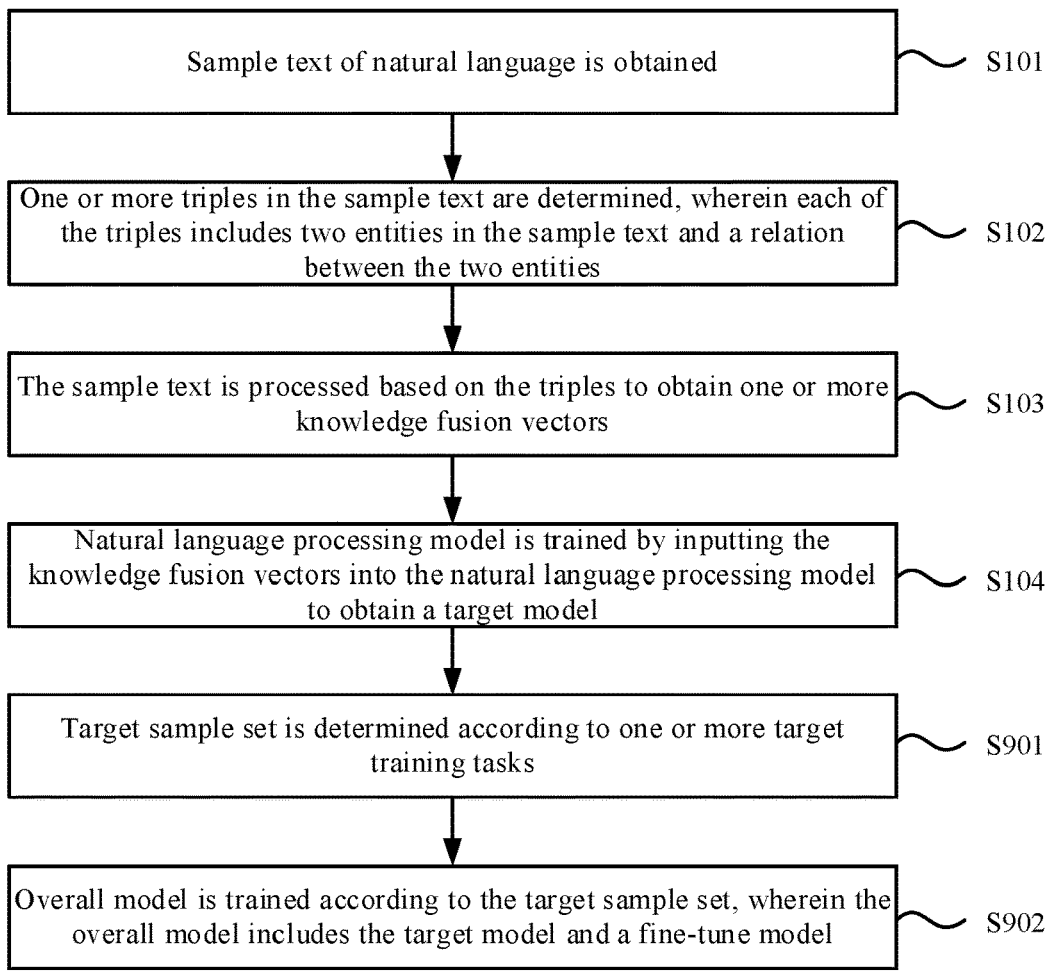
FIG. 9 is a schematic flowchart illustrating a method for training a natural language processing model according to an embodiment of the present disclosure.

FIG. 9 is a schematic flowchart illustrating a method for training a natural language processing model according to an embodiment of the present disclosure. As shown in FIG. 9, the method further includes:

in step S901, a target sample set is determined according to one or more target training tasks;

in step S902, an overall model is trained according to the target sample set, wherein the overall model includes the target model and a fine-tune model.

In one embodiment, the target model obtained by training the natural language model based on one or more pretraining tasks can be a pretraining model. Through a large number of corpora and multi-task learning, the pretraining model enables the target model to learn general grammar and semantic knowledge better and form a general model with good generalization. After obtaining the target model, a target training task (fine-tune task) can also be constructed according to one or more specific application scenarios in the embodiment of the present disclosure. For training samples of the target training task, a target sample set smaller than the pretraining sample set can be obtained according to the application scenarios, and the training model of the fine-tune task can be trained by adding a fine-tune model as the overall model on the basis of the trained target model, so as to more accurately adapt to the requirements of the specific application scenarios. A pretraining combined with fine-tune training mode is an application of transfer learning, and has good scalability. Since the pretraining model has good generalization ability, when training the model based on one or more new application scenarios, parameters of the pretraining model can be used for initialization, and the overall model can be fine-tuned to get better training results.

In one embodiment, the fine-tune model includes at least one of:
a convolutional neural network (CNN) model;
a recurrent neural network (RNN) model;
a gated recurrent unit (GRU) model;
a fully connected (FC) layer; or
a long short-term memory (LSTM) model.

In the embodiment shown in FIG. 1, the processing the sample text based on the triples to obtain one or more knowledge fusion vectors mainly includes two embodiments, one is "performing masking on the tokens corresponding to the entities within the triples in the sample text to obtain the knowledge fusion vector" described above to obtain the embedding vectors of the tokens corresponding to the triple; and the other is the fusion of the sample text and the triples.

These two embodiments can be realized independently or in combination. For example, on the basis of "performing masking on the tokens corresponding to the triples in the sample text to obtain the knowledge fusion vector" and further to obtain the embedding vectors of the tokens corresponding to the triple, the sample text and the triples can be fused to obtain the knowledge fusion vector, or masking can be performed on the tokens corresponding to the triple in the fusion process of the sample text and the triple, and the embodiment of the present disclosure is not limited to this. Hereinafter, the embodiment of processing the sample text based on the triples to obtain one or more knowledge fusion vectors including the sample text and the triples will be described based on several embodiments.

Figure 10:
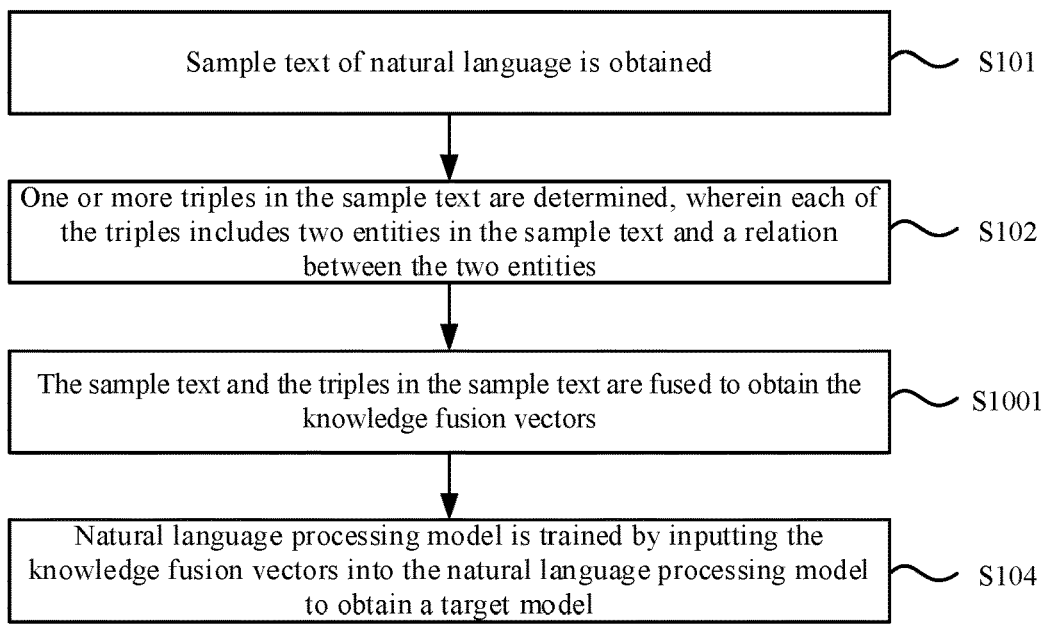
FIG. 10 is a schematic flowchart illustrating a method for training a natural language processing model according to an embodiment of the present disclosure.

FIG. 10 is a schematic flowchart illustrating a method for training a natural language processing model according to an embodiment of the present disclosure. As shown in FIG. 10, processing the sample text based on the triples to obtain one or more knowledge fusion vectors includes:

in step S1001, the sample text and the triples in the sample text are fused to obtain the knowledge fusion vectors.

In one embodiment, the sample text and the triples in the sample text can be fused to obtain the knowledge fusion vectors, and then the obtained knowledge fusion vectors are used as samples to form a sample set; further, training is performed on the natural language processing model based on the sample set, wherein training tasks used for training can include one or more of several pretraining tasks described in the previous embodiments.

Since the knowledge fusion vectors as the samples includes not only the features of the sample text, but also the features of the triples in the sample text, compared with the sample text, the knowledge fusion vectors include more features, and the relation between the entities in the sample text can be reflected more comprehensively, thereby expressing the sample text more accurately. Therefore, the target model obtained by training the natural language processing model based on the knowledge fusion vectors has better effect on natural language processing.

With regard to how to fuse the sample text and the triples in the sample text to obtain the knowledge fusion vectors, two fusion methods are mainly illustrated in the following embodiments. One is to insert the triples in the sample text to obtain the knowledge fusion vectors, and the other is to determine text embedding vectors corresponding to the sample text and the knowledge embedding vectors corresponding to the triples, and then fuse the text embedding vectors and the knowledge embedding vectors to obtain the knowledge fusion vectors. However, in specific applications, the fusion method is not limited to the above two fusion methods, and can be selected as required.

Figure 11:
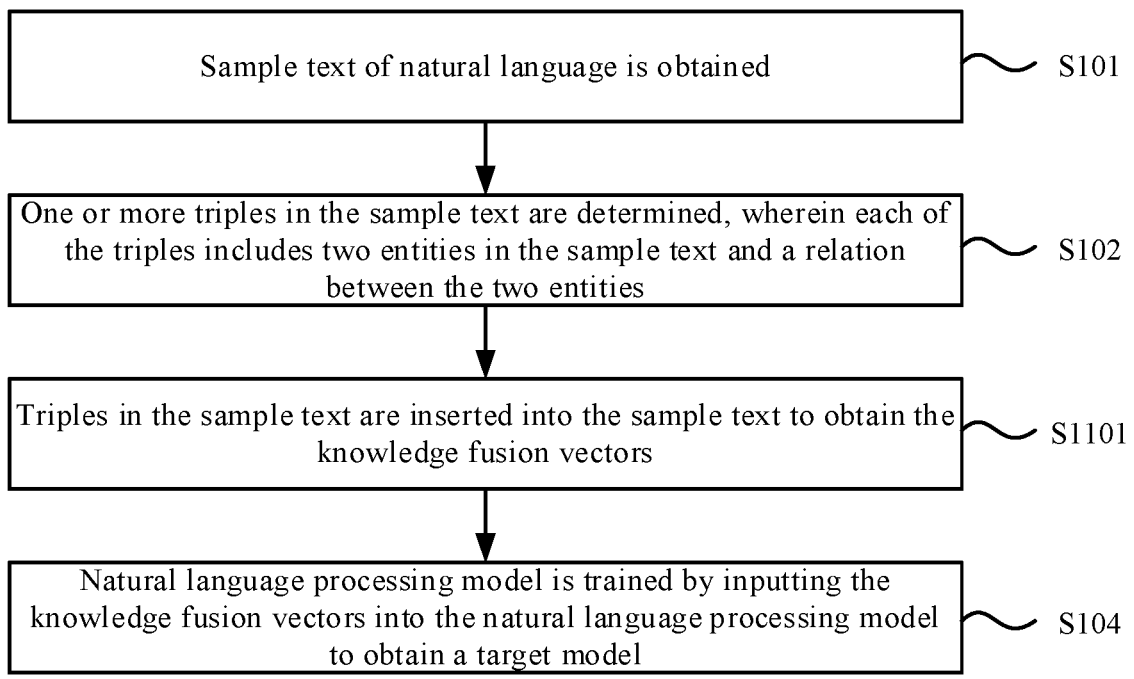
FIG. 11 is a schematic flowchart illustrating a method for training a natural language processing model according to an embodiment of the present disclosure.

FIG. 11 is a schematic flowchart illustrating a method for training a natural language processing model according to an embodiment of the present disclosure. As shown in FIG. 11, fusing the sample text and the triples in the sample text to obtain the knowledge fusion vectors includes:

in step S1101, triples in the sample text are inserted into the sample text to obtain the knowledge fusion vectors.

In one embodiment, the triples can be inserted in the sample text. For example, the triples can be inserted between characters in the sample text, or can be inserted after the last word of the sample text, or can also be inserted before the first word of the sample text. Further, an insertion position of the triples in the sample text can be set as required, and the insertion position of the triples in the sample text can also be determined randomly.

In one embodiment, word embedding processing can be performed on the sample text inserted with the triples to obtain the knowledge fusion vectors. The method of performing the word embedding processing includes at least one of one-hot encoding, word2vec, or thesaurus conversion.

In one embodiment, the method of performing the word embedding processing on the sample text inserted with the triples can also be that word embedding vectors are obtained by multiplying the sample text inserted into the triplets with a trainable weight after the one-hot encoding, or the word embedding vectors are obtained through word2vec after the one-hot encoding and multiplying the sample text inserted into the triplets with the trainable weight, and the embodiment of the present disclosure is not limited to this.

In one embodiment, the knowledge fusion vectors can further include at least one of:
one or more sentence embedding vectors, one or more position embedding vectors corresponding to the tokens of the triples, or one or more task type embedding vectors.

It should be noted that the triples can be inserted into the sample text as a whole, or the head entity, the relation and the tail entity in the triples can be inserted into the sample text as three parts respectively, for example, these three parts can be inserted into different positions in the sample text.

Figure 12:
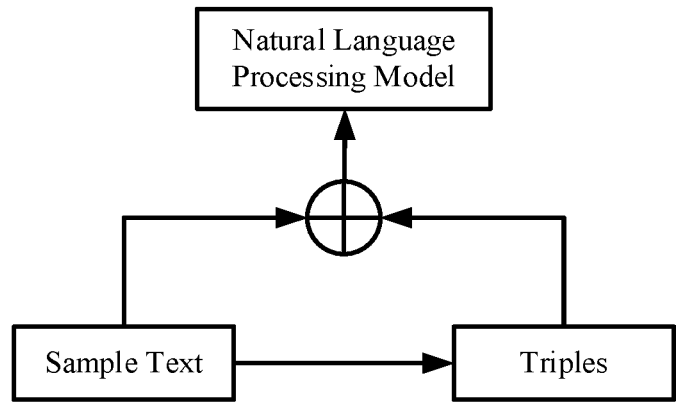
FIG. 12 is a schematic diagram illustrating a relationship between a fusion process and a natural language processing model according to an embodiment of the present disclosure.

FIG. 12 is a schematic diagram illustrating a relationship between a fusion process and a natural language processing model according to an embodiment of the present disclosure.

As shown in FIG. 12, a triple in a sample text can be determined, wherein the triple includes two entities and a relation between the two entities in the sample text; and then, the triple can be inserted into the sample text to obtain a knowledge fusion vector; finally, the knowledge fusion vector can be input into a natural language processing model as a sample for training. The triple can be regarded as key information in the sample text. By inserting the triple into the sample text for training the model, the model can repeatedly learn the key information in the sample text, thereby better improving the training effect of the model.

In one embodiment, based on the embodiment of FIG. 12, when a first training task includes a masking task to perform masking on the sample text based on the triple, masking can be performed on the inserted triple and the original sample text respectively. This can not only ensure the masking of the triple, but also perform masking on non-triple information in the sample text.

Figure 13:
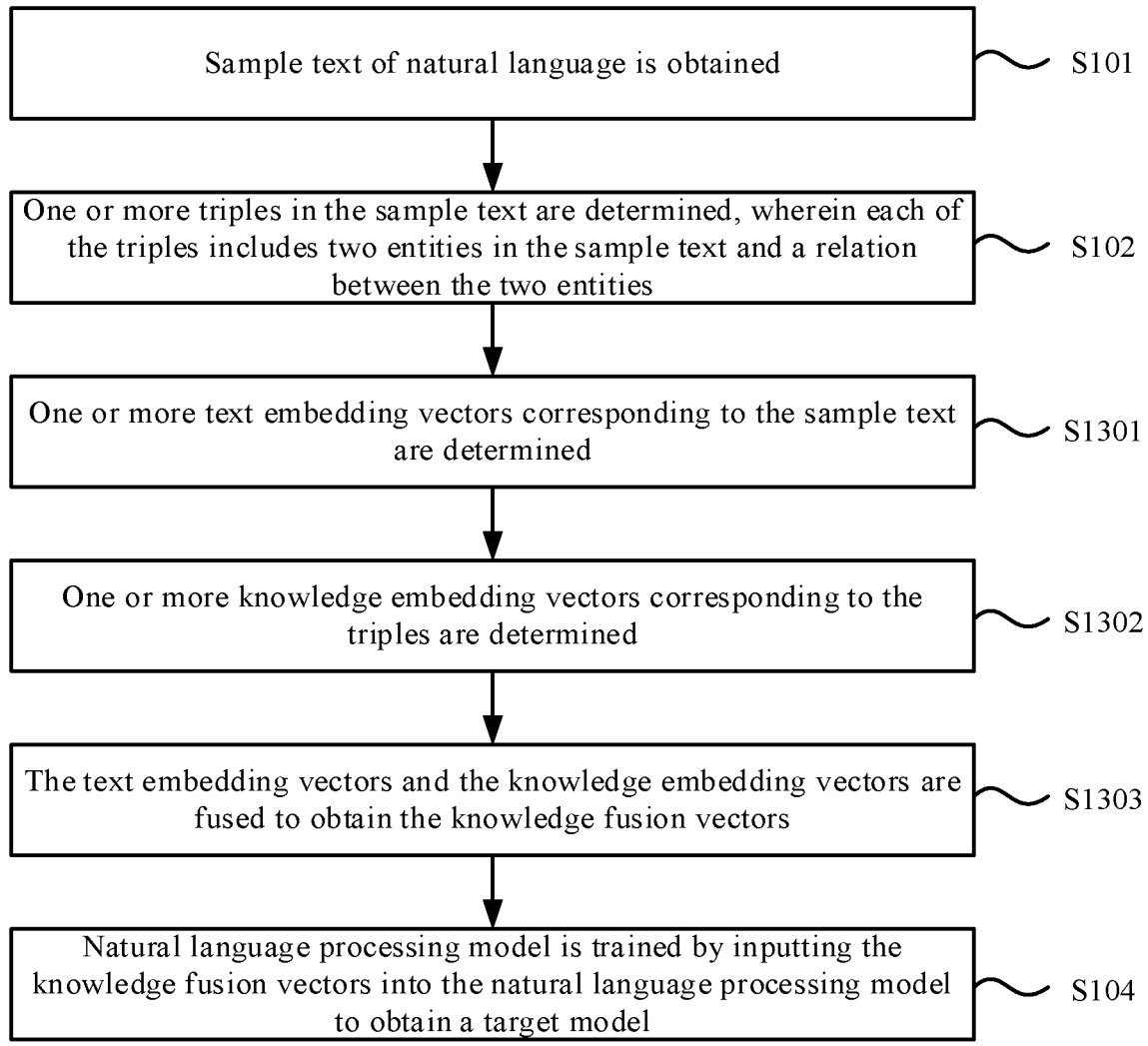
FIG. 13 is a schematic flowchart illustrating a method for training a natural language processing model according to an embodiment of the present disclosure.

FIG. 13 is a schematic flowchart illustrating a method for training a natural language processing model according to an embodiment of the present disclosure. As shown in FIG. 13, fusing the sample text and the triples in the sample text to obtain the knowledge fusion vectors includes:
in step S1301, one or more text embedding vectors corresponding to the sample text are determined;
in step S1302, one or more knowledge embedding vectors corresponding to the triples are determined;
in step S1303, the text embedding vectors and the knowledge embedding vectors are fused to obtain the knowledge fusion vectors.

In one embodiment, on the one hand, one or more text embedding vectors corresponding to the sample text can be determined, and on the other hand, one or more knowledge embedding vectors corresponding to the triples can be determined. For example, the knowledge embedding vectors can be obtained by using a preset algorithm (for example, a graph embedding translation algorithm), wherein the preset algorithm can include, but not limited to, TranR, TransE, TransH, and TransD.

In one embodiment, the method of performing the word embedding processing on the sample text to obtain the corresponding text embedding vectors includes at least one of one-hot encoding, word2vec, or thesaurus conversion.

In one embodiment, the method of performing the word embedding processing on the sample text can also be that word embedding vectors are obtained by multiplying the sample text inserted into the triplets with a trainable weight after the one-hot encoding, or the word embedding vectors are obtained through word2vec after the one-hot encoding and multiplying the sample text inserted into the triplets with the trainable weight, and the embodiment of the present disclosure is not limited to this.

In one embodiment, the triples include at least one of:
a head entity, a relation, or a tail entity.

Embedding vectors $h_e$ of the head entity h, embedding vectors $t_e$ of the tail entity t, and embedding vectors $r_e$ of the relation r can be respectively obtained by using the graph embedding translation algorithm.

In one embodiment, the specific steps of obtaining the knowledge embedding vectors by using the TransR algorithm are as follows:
1) projecting entities h and t in an entity space into a space of a relation r (that is, a relation space) through a projection matrix Mr to obtain $h_e$ and $t_e$, where $h_e$=hMr, and $t_e$=tMr;
2) a target function for training the model is $f_r(h, t)=\|h_e + r_e - t_e\|_2^2$, training is performed based on the loss function to make the target function reach the minimum value, so that the embedding vectors $h_e$, $r_e$ and $t_e$ corresponding to h, r and t respectively can be obtained. For example, a target loss function can be:

$$L = \sum_{(h,r,t) \in S} \sum_{(h',r',t') \in S'} \max(0, f_r(h, t) + \gamma - f_r(h', t')),$$

where h' and t' respectively represent the head entity and the tail entity that have been randomly replaced, and the head entity or the tail entity is randomly replaced on the basis of a correct triple (h, r, t) and the replaced triple is different from the original triple, this part is a negative sample.

In one embodiment, determining the knowledge embedding vectors corresponding to the triples includes:
fusing one or more embedding vectors of the head entity, one or more embedding vectors of the relation and one or more embedding vectors of the tail entity to obtain the knowledge embedding vectors:

$$e_k = concat(h_e + r_e + t_e),$$

where $e_k$ represents the knowledge embedding vectors, $h_e$ represents the embedding vectors of the head entity, $r_e$ represents the embedding vectors of the relation, $t_e$ represents the embedding vectors of the tail entity, and concat( ) represents a splicing function.

In one embodiment, the text embedding vectors include the text embedding vectors themselves, and further include at least one of:
one or more sentence embedding vectors, one or more position embedding vectors corresponding to the tokens of the triples, or one or more task type embedding vectors.

On the basis of fusing the text embedding vectors themselves and the knowledge embedding vectors to obtain the knowledge fusion vectors, other embedding vectors can be further fused to obtain the knowledge fusion vectors. Other embedding vectors can be determined according to the training tasks, and the present disclosure is not limited to the above. For example, it is necessary to perform a second pretraining task, and other embedding vectors can include the sentence embedding vectors. For example, it is necessary to perform a fourth pretraining task, and other embedding vectors can include the task type embedding vectors, wherein the fourth pretraining task can be a task for classifying types of the training tasks.

With regard to how to fuse the text embedding vectors and the knowledge embedding vectors, two fusion methods are mainly illustrated in the following embodiments. However, in specific applications, the fusion method is not limited to the above two fusion methods, and can be selected as required.

Figure 14:
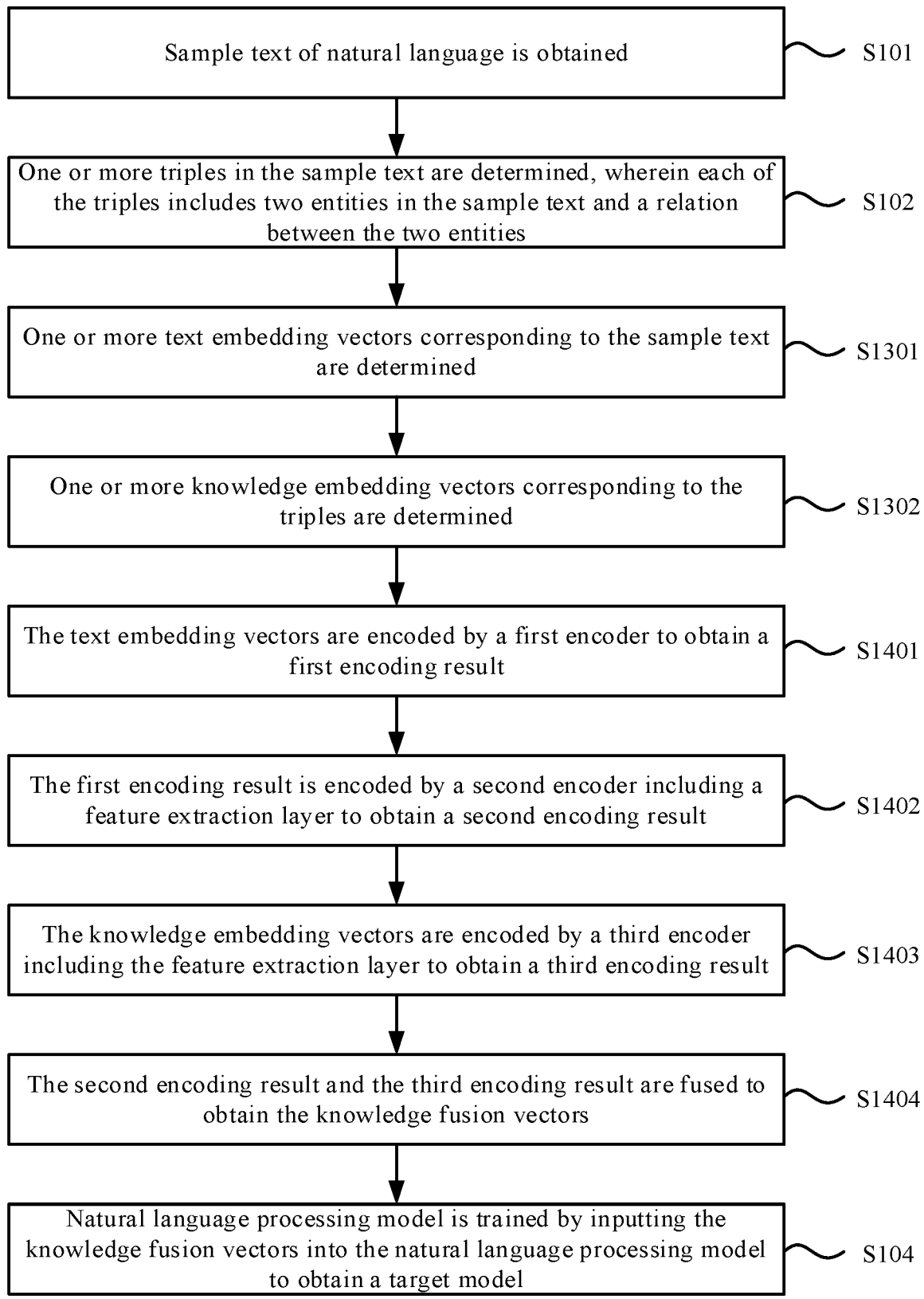
FIG. 14 is a schematic flowchart illustrating a method for training a natural language processing model according to an embodiment of the present disclosure.

FIG. 14 is a schematic flowchart illustrating a method for training a natural language processing model according to an embodiment of the present disclosure. As shown in FIG. 14, fusing the text embedding vectors and the knowledge embedding vectors includes:
in step S1401, feature extraction is performed on the text embedding vectors through one or more feature extraction layers to obtain one or more text feature vectors;
in step S1402, feature extraction is performed on the knowledge embedding vectors through one or more feature extraction layers to obtain one or more knowledge feature vectors (the order of executing step S1402 and step S1401 is not in order, and can be set as required, for example, in parallel);
in step S1403, the text feature vectors and the knowledge feature vectors are fused to obtain the knowledge fusion vectors.

In one embodiment, the feature extraction can be performed on the text embedding vectors through one or more feature extraction layers to obtain one or more text feature vectors. For example, for the text embedding vectors, a feature extraction layer A can be used to perform feature extraction to obtain the text feature vectors.

For the knowledge embedding vectors, a feature extraction layer B can be used to perform feature extraction to obtain the knowledge feature vectors.

Finally, the text feature vectors and the knowledge feature vectors can be fused to obtain the knowledge fusion vectors. Fusing the text feature vectors and the knowledge feature vectors includes:
fusing the text feature vectors and the knowledge feature vectors through a multi-layer perceptron (MLLP) layer. The knowledge embedding vectors include at least one of: one or more embedding vectors of one or more entities belonging to the triples; or one or more embedding vectors of one or more relations belonging to the triples.

That is, for the knowledge embedding vectors, feature extraction can be performed only on the embedding vectors of the entities in the triples through the feature extraction layer B to obtain the knowledge feature vectors, or feature extraction can be performed only on the embedding vectors of the relations in the triples through the feature extraction layer B to obtain the knowledge feature vectors, or feature extraction can be performed on the embedding vectors of the entities and the relations in the triples through the feature extraction layer B to obtain the knowledge feature vectors. It can be understood that there may be one or more feature extraction layers A and one or more feature extraction layers B.

Figure 15:
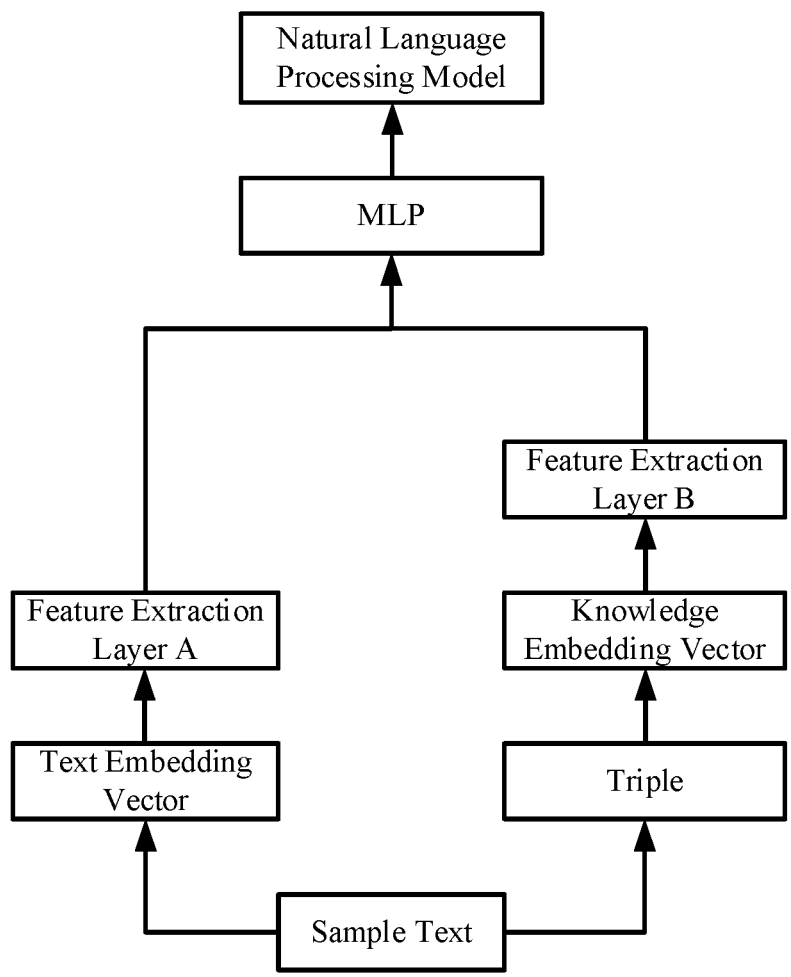
FIG. 15 is a schematic diagram illustrating a relationship between a fusion process and a natural language processing model according to an embodiment of the present disclosure.

FIG. 15 is a schematic diagram illustrating a relationship between a fusion process and a natural language processing model according to an embodiment of the present disclosure.

As shown in FIG. 15, on the one hand, the text embedding vectors corresponding to the sample text can be determined; on the other hand, the triples can be determined in the sample text, and then the knowledge embedding vectors corresponding to the triples in the knowledge graph can be determined.

Next, on the one hand, the text embedding vectors can be input into the feature extraction layer A to obtain the extraction result as the text feature vectors; on the other hand, the knowledge embedding vectors can be input into the feature extraction layer B to obtain the knowledge feature vectors.

Finally, the text feature vectors and the knowledge feature vectors can be fused through the MLP layer to obtain the knowledge fusion vectors, and the knowledge fusion vectors can be input into the natural language processing model as a sample for training.

It can be understood that the selection of the feature extraction layers A and the feature extraction layers B is related to the natural language processing model, that is, the feature extraction layer in the fusion process is the same as that in the natural language processing model, thereby ensuring that the natural language processing model can directly calculate the knowledge fusion vectors.

Figure 16:
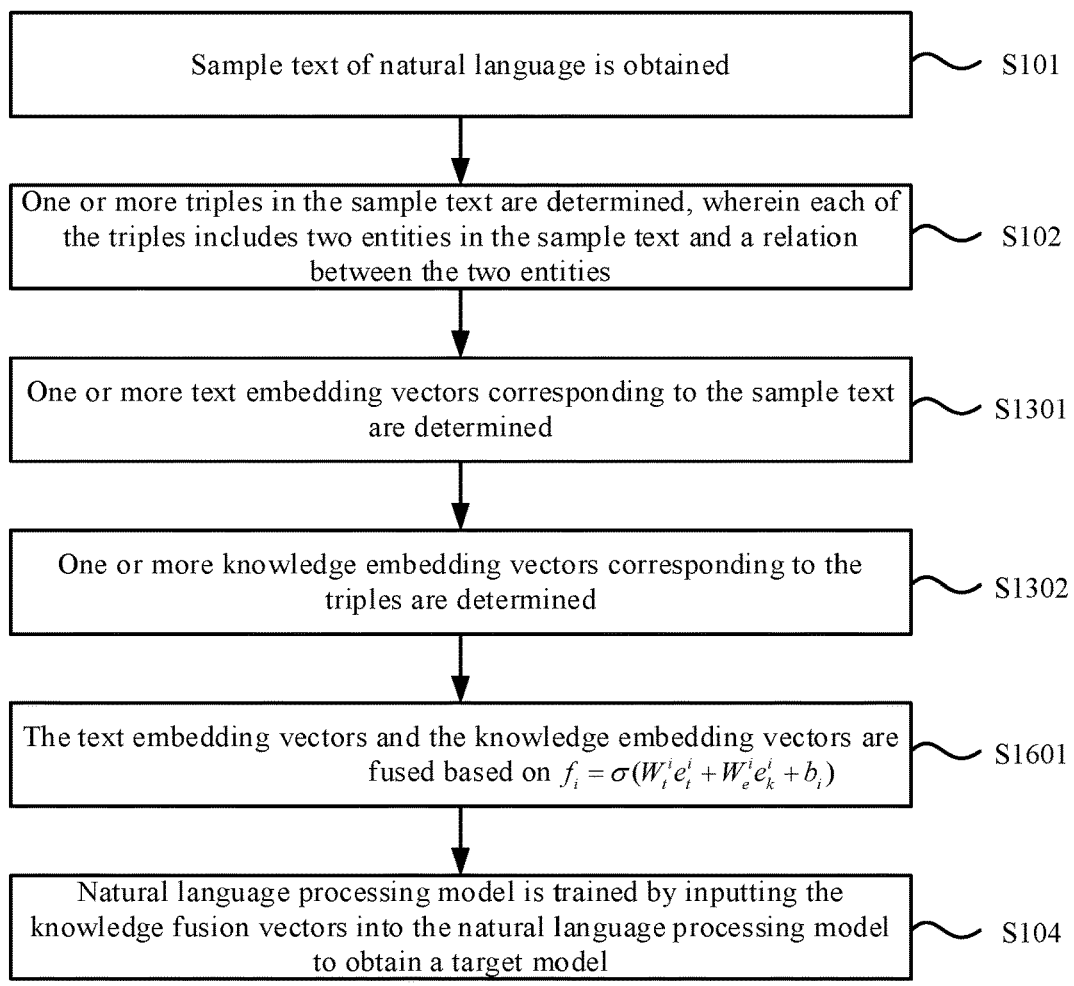
FIG. 16 is a schematic flowchart illustrating a method for training a natural language processing model according to an embodiment of the present disclosure.

FIG. 16 is a schematic flowchart illustrating a method for training a natural language processing model according to an embodiment of the present disclosure. As shown in FIG. 16, fusing the text embedding vectors and the knowledge embedding vectors includes:
in step S1601, the text embedding vectors and the knowledge embedding vectors are fused by using a knowledge fusion model:

$$f_i = \sigma(W_t^i e_t^i + W_e^i e_k^i + b_i),$$

where $f_i$ represents the knowledge fusion vectors, $e_t$ represents the text embedding vectors, $e_k$ represents the knowledge embedding vectors, $W_t$ represents a weight of the text embedding vectors, $W_e$ represents a weight of the knowledge embedding vectors, b represents a bias, and i represents the $i^{th}$ token in the corresponding sample text, and $\sigma$ represents an activation function.

In the embodiment of the present disclosure, $W_t$ and $W_e$ are the weight of the text embedding vectors and the knowledge embedding vector respectively, and can be used as parameters for training. By setting $W_t$ and $W_e$, the effect of a filter can be realized, and the impact of interference or useless tokens and knowledge on the fusion result can be reduced.

In one embodiment, the text embedding vectors and the knowledge embedding vectors can be fused by the activation function σ during the fusion process.

Figure 17A:
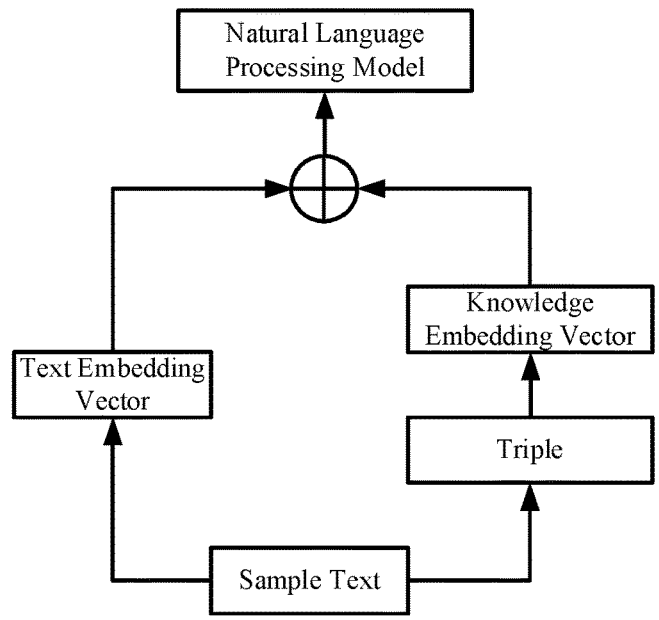
FIG. 17A is a schematic diagram illustrating a relationship between a fusion process and a natural language processing model according to an embodiment of the present disclosure.

FIG. 17A is a schematic diagram illustrating a relationship between a fusion process and a natural language processing model according to an embodiment of the present disclosure.

As shown in FIG. 17A, the triples in the sample text can be determined, wherein the triples include two entities and the relation between the two entities in the sample text; and then the knowledge embedding vectors corresponding to the triples can be determined; further, the knowledge embedding vectors and the text embedding vectors can be fused to obtain the knowledge fusion vectors, and finally the knowledge fusion vectors can be input into the natural language processing model as a sample.

As shown in FIG. 17A, on the one hand, the text embedding vectors corresponding to the sample text can be determined; on the other hand, the triples can be determined in the sample text, and then the knowledge embedding vectors corresponding to the triples in the knowledge graph can be determined.

Next, the text embedding vectors $e_t$ and the knowledge embedding vectors $e_k$ can be fused by using the knowledge fusion model $f_i = \sigma(W_t^i e_t^i + W_e^i e_k^i + b_i)$ to obtain the knowledge fusion vectors $f_i$; and finally the knowledge fusion vectors are input into the natural language processing model as a sample for training.

In one embodiment, the natural language processing model includes one or more feature extraction layers configured to:
  perform linear transformation on the knowledge fusion vectors to obtain at least two knowledge fusion matrices including a first knowledge fusion matrix and a second knowledge fusion matrix;
  determine an association matrix according to the first knowledge fusion matrix, wherein the association matrix is configured to represent association relation information between one or more entities in the sample text with the sample text; and
  determine a weight matrix according to the second knowledge fusion matrix and the association matrix, wherein the weight matrix is configured to represent weight information between the entities with the sample text.

Figure 17B:
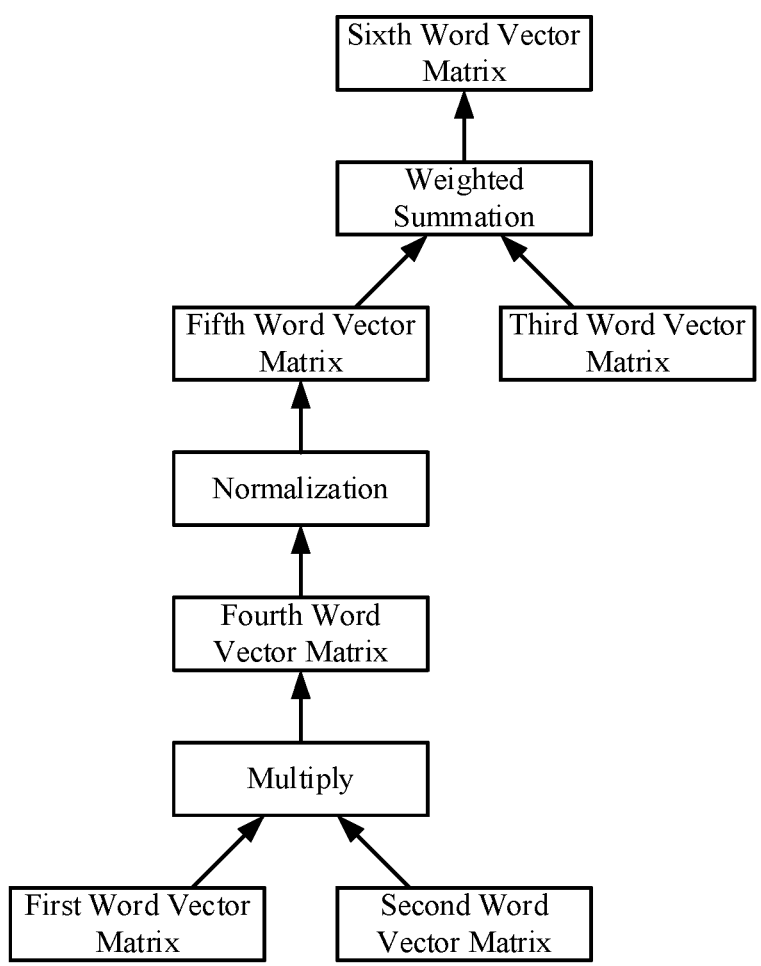
FIG. 17B is a schematic diagram illustrating a calculation process of feature extraction according to an embodiment of the present disclosure.

FIG. 17B is a schematic diagram illustrating a calculation process of feature extraction according to an embodiment of the present disclosure.

As shown in FIG. 17B, from the point of view of calculation process, the function of the feature extraction layer can be described as follows:
  the knowledge embedding vectors are multiplied with the training matrix to obtain a first word vector matrix, a second word vector matrix and a third word vector matrix;
  the first word vector matrix is multiplied with the second word vector matrix (transpose) to obtain a fourth word vector matrix;
  the fourth word vector matrix is normalized to obtain a fifth word vector matrix; and
  weighted summation is performed on the third word vector matrix based on the fifth word vector matrix to obtain the sixth word vector matrix.

Before the fourth word vector matrix is normalized, scale transformation can also be performed, that is, the fourth word vector matrix is divided by $\sqrt{d_k}$, where $d_k$ is a word embedding vector dimension.

It can be understood that based on the embodiment of FIG. 17B, the first word vector matrix is the first knowledge fusion matrix, the third word vector matrix is the second knowledge fusion matrix, the fourth word vector matrix or the fifth word vector matrix is the association matrix, and the sixth word vector matrix is the weight matrix. The second word vector matrix is the third knowledge fusion matrix. The weighted summation is performed on the third word vector matrix based on the fifth word vector matrix, that is, the fifth word vector matrix is multiplied with the third word vector matrix. The training matrix can continuously adjust the parameter matrix in the training process, and the knowledge embedding vectors are multiplied with the training matrix having different parameters obtained by training to obtain the first word vector matrix, the second word vector matrix and the third word vector matrix. These three word vector matrices all include at least the text information and knowledge information (entities) in the knowledge embedding vectors, therefore, three word vector matrices can all be called the knowledge fusion matrices. In order to obtain the association matrix representing the association relation information between at least one entity in the sample text with respective tokens in the sample text, it can be calculated by the inner product of two fusion matrices (that is, the first word vector matrix is multiplied with the transpose of the second word vector matrix) or by covariance, Euclidean distance, and the like, and the embodiment of the present disclosure is not limited to this. By multiplying the obtained association relation with the fusion matrix itself (that is, the weighted summation is performed on the third word vector matrix based on the fifth word vector matrix), the weights of respective tokens (including entities) relative to the whole sample text (that is, the weight matrices) can be obtained. Matrix multiplication can also be multiplication with the transpose of the matrix, which can be adjusted according to the actual situation, and the embodiment of the present disclosure is not limited to this.

In one embodiment, the feature extraction layer can combine results obtained through multiple parallel calculations and input the results as a whole into a next layer of the model, so that the results can be mapped to different subspaces for calculation, thereby improving the accuracy of the model.

In one embodiment, the feature extraction layer can include, but not limited to, an attention layer, a self-attention layer, and a multi-head self-attention layer. In the case that the feature extraction layer includes the self-attention layer, the natural language processing model can be a Transformer model, a TransformerXL model, a Bert model, a GPT model, and the like, and the embodiment of the present disclosure is not limited to this.

In one embodiment, a dimension of the natural language model is variable, and the dimension refers to a dimension of the knowledge fusion vectors input into the model.

In one embodiment, the dimension of the natural language model is variable includes: adjusting the dimension of the natural language model according to preset conditions such as user settings and hardware resources.

In another embodiment, the dimension of the natural language model is variable includes: the natural language model includes at least two feature extraction layers, for example, at least a first feature extraction layer and a second feature extraction layer, and dimensions of the first feature extraction layer and the second feature extraction layer are different. It can be understood that the dimensions of the first feature extraction layer and the second feature extraction layer are different means that dimensions of the association matrix and/or the weight matrix of the first feature extraction layer and the second feature extraction layer are different.

In one embodiment, the feature extraction layers at least include a first feature extraction layer and a second feature extraction layer, wherein a dimension of the association matrix in the second feature extraction layer is variable relative to a dimension of the weight matrix in the first feature extraction layer. In one embodiment, the dimension of the second feature extraction layer is smaller than that of the first feature extraction layer. In the process of deep learning of multiple feature extraction layers of the natural language model, by gradually reducing the dimension of the feature extraction layer, it is beneficial to reduce the parameter quantity, improve the operation efficiency and enhance the real-time ability. The number of times of reducing the dimension can be one time or two or three times, and the embodiment of the present disclosure is not limited to this.

In one embodiment, the feature extraction layers further include one or more third feature extraction layers, wherein the third feature extraction layers include a masking matrix, and the masking matrix is configured to partially mask the association matrix. For example, both the first feature extraction layer and the second feature extraction layer are multi-head self-attention layers, the third feature extraction layers can be a masked multi-head self-attention layer, which will be mainly described in the following embodiments.

In one embodiment, the third feature extraction layers are located after the first feature extraction layer.

In one embodiment, a dimension of the third feature extraction layers can be smaller than that of the first feature extraction layer and equal to that of the second feature extraction layer.

Figure 18:
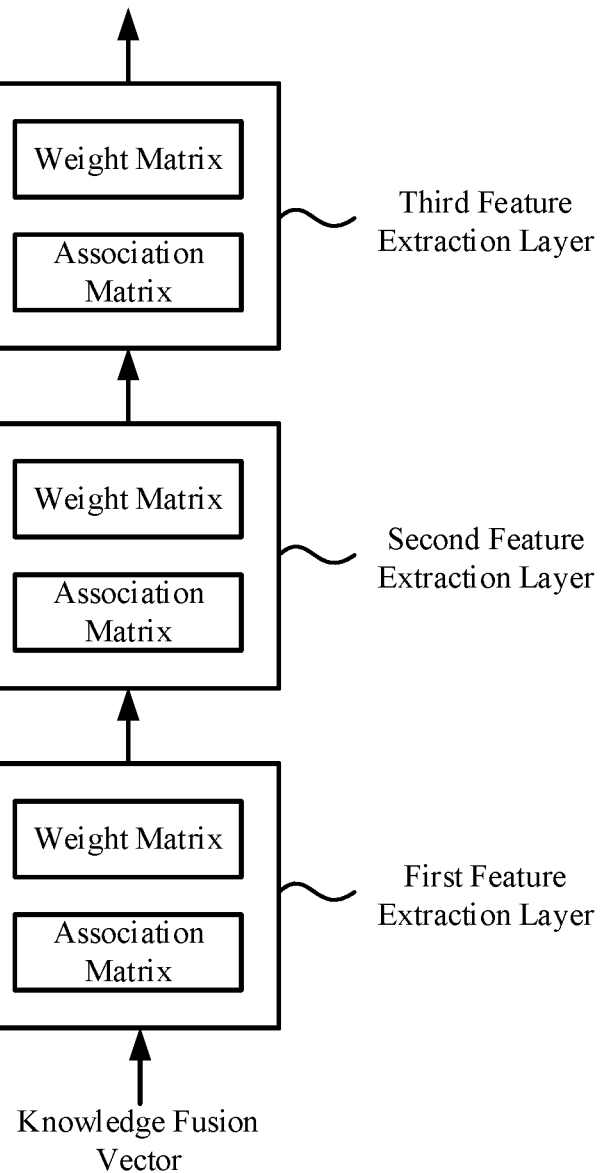
FIG. 18 is a schematic diagram illustrating a relationship between feature extraction layers according to an embodiment of the present disclosure.
Figure 19:
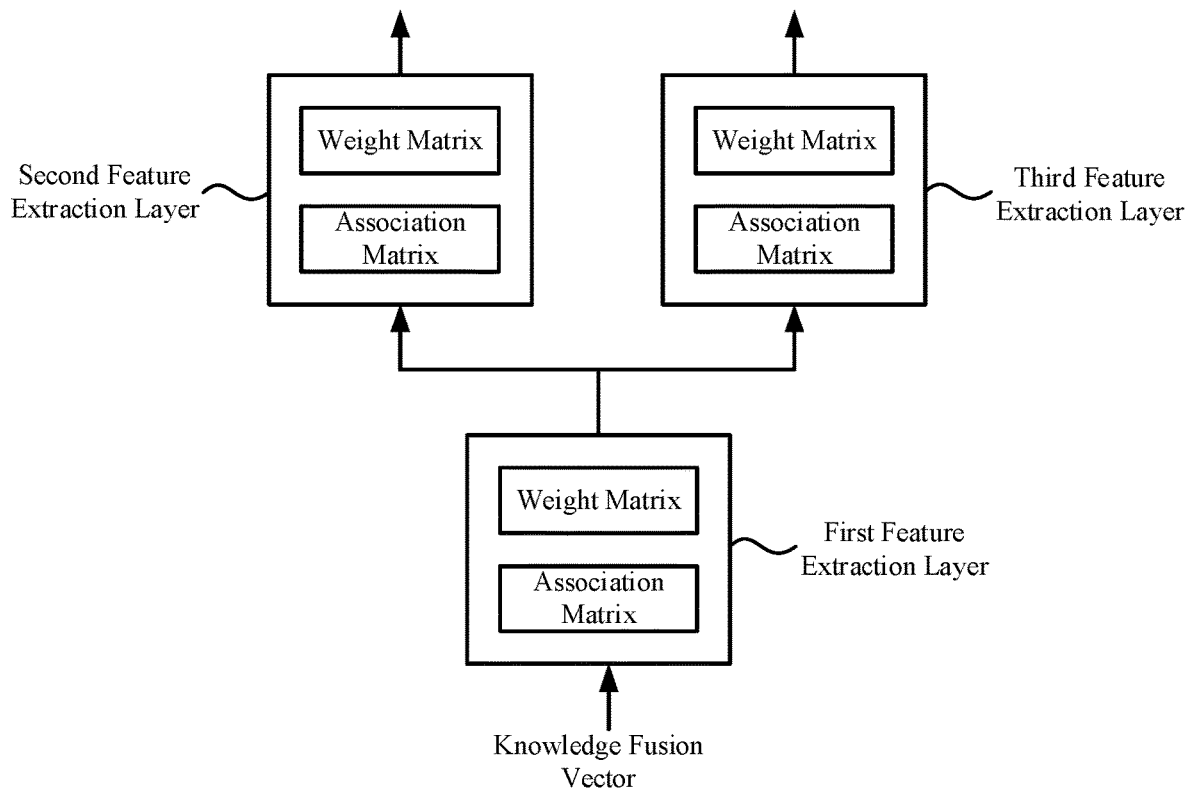
FIG. 19 is a schematic diagram illustrating a relationship between feature extraction layers according to an embodiment of the present disclosure.

FIG. 18 is a schematic diagram illustrating a relationship between feature extraction layers according to an embodiment of the present disclosure. FIG. 19 is a schematic diagram illustrating a relationship between feature extraction layers according to an embodiment of the present disclosure.

In one embodiment, as shown in FIG. 18, the third feature extraction layers are located after the first feature extraction layer can be that the third feature extraction layers are located after the first feature extraction layer and located after the second feature extraction layer.

It should be noted that in all embodiments of the present disclosure, one layer is located after another layer means that an output of a previous layer is used as an input of a later layer; one layer is located before another layer means that the input of the later layer includes the output of the previous layer. The output of the previous layer can be directly used as the input of the later layer, or can be used as the input of the later layer after other calculations.

In one embodiment, as shown in FIG. 19, the third feature extraction layers are located after the first feature extraction layer can be on the basis that the second feature extraction layer is located after the first feature extraction layer, the third feature extraction layers and the second feature extraction layer are located side by side after the first feature extraction layer.

An output of the target model can include an output through all feature extraction layers, or an output through some feature extraction layers, for example, an output through one or more first feature extraction layers, an output through one or more first feature extraction layers and one or more second feature extraction layers, or an output through one or more first feature extraction layers and one or more third feature extraction layers. It can be understood that after the output of one or more first feature extraction layers and one or more second feature extraction layers, the third feature extraction layers are frozen from participating in the training process; after the output of one or more first feature extraction layers and one or more third feature extraction layers, the second feature extraction layers are frozen and do not participate in the training process.

In one embodiment, a training task is a generation task, the second feature extraction layer is frozen; and the training task is a semantic understanding task, the third feature extraction layers are frozen. The training task can include the above pretraining task (the pretraining task can include not only the above three pretraining tasks, but also the generation task), or can also include subsequent fine-tune tasks. For example, the first pretraining task, the second pretraining task and the third pretraining task can be regarded as the semantic understanding task, therefore, a fifth pretraining task can also be constructed to generate a prediction task of contents to be input according to the input text, and the fifth pretraining task can be regarded as the generation task.

The masking matrix can be set in the third feature extraction layers to realize the prediction task. In this case, the second feature extraction layer can be used for semantic understanding, and the third feature extraction layers can be used for predicting the following contents, for example, a text to be input can be predicted according to the input text, and the text to be input can be generated.

Therefore, if the training task is the generation task, the second feature extraction layer can be frozen based on the third feature extraction layers; if the training task is the semantic understanding task, the third feature extraction layers can be frozen based on the second feature extraction layer. Therefore, it is beneficial to simplify the training process.

In one embodiment, a first dimension conversion layer is located between the first feature extraction layer and the second feature extraction layer, and is configured to change the dimension of the weight matrix obtained by the first feature extraction layer and take an output matrix obtained by changing the dimension as an input of the second feature extraction layer, thereby realizing the dimension change between the feature extraction layers.

Since the dimensions of the first feature extraction layer and the second feature extraction layer can be different, for example, the dimension of the first feature extraction layer is larger than that of the second feature extraction layer, for example, the dimension of the first feature extraction layer can be 4096, and the dimension of the second feature extraction layer can be 768.

In order to input the output of the first feature extraction layer into the second feature extraction layer, it is necessary to convert the dimension of the output of the first feature extraction layer to the dimension of the second feature extraction layer first. Therefore, the first dimension conversion layer can be set between the first feature extraction layer and the second feature extraction layer to change the dimension of the weight matrix obtained by the first feature extraction layer and obtain a dimension-reduced output matrix as the input of the second feature extraction layer.

For example, when the dimension of the first feature extraction layer is 4096 and the dimension of the second feature extraction layer is 768, the dimension conversion can specifically be dimension reduction.

In one embodiment, the first dimension conversion layer can be composed of one or more dimension conversion units including a liner layer.

For example, for each of the dimension conversion units, the output of the first feature extraction layer can include one or more output embedding vectors, the output embedding vectors are input into the linear layer, and the linear layer can reduce the dimension of the output of the first feature extraction layer (that is, the dimension of the output of the first feature extraction layer can be adjusted); further, the dimension-reduced output of the first feature extraction layer is input into the next feature extraction layer such as the second feature extraction layer and/or the third feature extraction layers.

In one embodiment, the output of the first feature extraction layer can be gradually reduced to the same dimension as that of the second feature extraction layer through the processing of the linear layers in a plurality of dimension conversion units.

Figure 20:
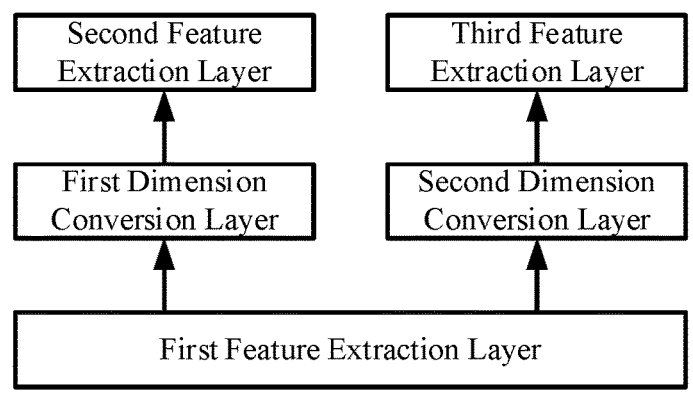
FIG. 20 is a schematic diagram illustrating a dimension conversion according to an embodiment of the present disclosure.

FIG. 20 is a schematic diagram illustrating a dimension conversion according to an embodiment of the present disclosure.

In one embodiment, as shown in FIG. 20, a second dimension conversion layer is located between the first feature extraction layer with the third feature extraction layers, and is configured to change the dimension of the weight matrix obtained by the first feature extraction layer and take a dimension-reduced output matrix as an input of the third feature extraction layers. It should be noted that the first dimension conversion layer and the second dimension conversion layer can be different dimension conversion layers as shown in FIG. 20, or can also be set as the same dimension conversion layer as required.

In one embodiment, the dimension of the third feature extraction layers can be the same as that of the second feature extraction layer, for example, the dimension of the third feature extraction layers can also be 768. In order to input the output of the first feature extraction layer into the third feature extraction layers, it is necessary to convert the dimension of the output of the first feature extraction layer to the dimension of the third feature extraction layers. Therefore, the second dimension conversion layer can be set between the first feature extraction layer with the third feature extraction layers to change the dimension of the weight matrix obtained by the first feature extraction layer and obtain the dimension-reduced output matrix as the input of the third feature extraction layers.

The principle of the second dimension conversion layer is similar to that of the first dimension conversion layer, which will not be described here.

Figure 21:
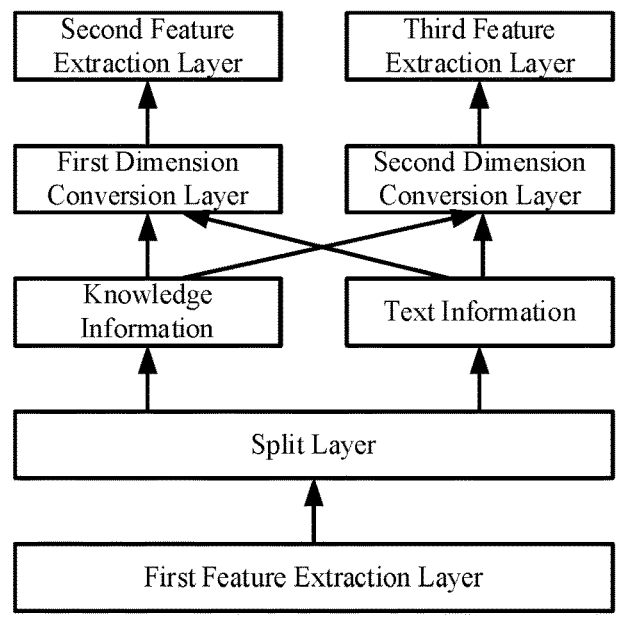
FIG. 21 is a schematic diagram illustrating a dimension conversion according to an embodiment of the present disclosure.

FIG. 21 is a schematic diagram illustrating a dimension conversion according to an embodiment of the present disclosure.

In one embodiment, as shown in FIG. 21, a split layer is located before the second feature extraction layer and the third feature extraction layers, and is configured to split an output of the first feature extraction layer into knowledge information and text information.

The first dimension conversion layer is configured to change the dimension of the weight matrix obtained by the first feature extraction layer to obtain a dimension-reduced output matrix as an input of the second feature extraction layer, or to change a dimension of the knowledge information to obtain a dimension-reduced matrix as the input of the second feature extraction layer.

The second dimension conversion layer is located between the first feature extraction layer with the third feature extraction layers, and configured to change the dimension of the weight matrix obtained by the first feature extraction layer to obtain a dimension-reduced output matrix as an input of the third feature extraction layers, or to change a dimension of the text information to obtain a dimension-reduced matrix as the input of the third feature extraction layers.

In one embodiment, since the input of the first feature extraction layer includes the knowledge fusion vectors, and the knowledge fusion vectors are obtained by fusing the text embedding vectors corresponding to the sample text and the knowledge embedding vectors corresponding to the triples, the output of the first feature extraction layer also includes knowledge information related to the knowledge embedding vectors and text information related to the text embedding vectors.

In addition, based on the foregoing embodiments, it can be seen that the second feature extraction layer is mainly used for the semantic understanding task, and the third feature extraction layers are mainly used for the generation task. The semantic understanding task mainly focuses on the tokens and the relation between the tokens in the text, therefore, the semantic understanding task can be relatively accurately expressed by knowledge information. The generation task mainly focuses on the tokens themselves in the text, and pays less attention to the relation between the tokens; therefore, the generation task can be relatively accurately expressed by text information.

Accordingly, for the second feature extraction layer, only the knowledge information can be used as input; therefore, the first dimension conversion layer can only perform dimension conversion on the knowledge information, and then the converted knowledge information is input into the second feature extraction layer. For the third feature extraction layer, only the text information can be used as input; therefore, the second dimension conversion layer can only perform dimension conversion on the text information, and the converted text information is input into the third feature extraction layer. By setting the split layer, redundant data can be reduced and the calculation efficiency can be further improved.

In one embodiment, after the triples in the sample text are inserted into the sample text to obtain the knowledge fusion vectors, corresponding positions that the triples are inserted into the text can be marked; and after an output vector matrix is obtained through the first feature extraction layer, matrix information corresponding to the knowledge information (such as the triples) and the text information in the output vector matrix can be split through the split layer according to the marked positions of the triples to generate a knowledge information matrix and a sample text information matrix.

Certainly, the dimensions of the text information and the knowledge information can be changed through the first dimension conversion layer, and the changed text information and knowledge information can be input into the second feature extraction layer; or the dimensions of the text information and the knowledge information can be changed through the second dimension conversion layer, and the changed text information and knowledge information can be input into the third feature extraction layer.

In one embodiment, in the case that the natural language processing model includes the first feature extraction layer, the second feature extraction layer and the third feature extraction layer, the natural language processing model can further include a residual network, a feedforward neural network layer, and the like.

Figure 22A:
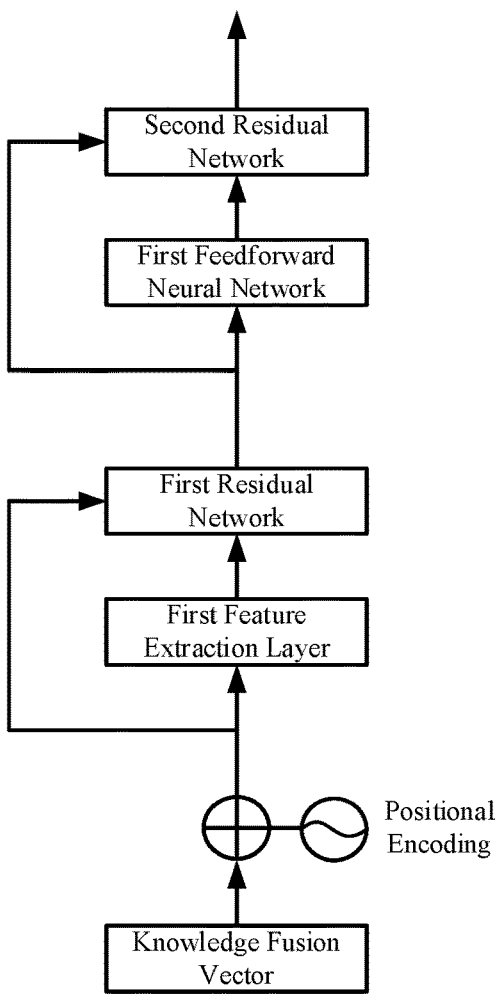
FIG. 22A is a schematic structural diagram illustrating a first feature extraction layer according to an embodiment of the present disclosure.

FIG. 22A is a schematic structural diagram illustrating a first feature extraction layer according to an embodiment of the present disclosure.

In one embodiment, as shown in FIG. 22A, the natural language processing model includes:

the first feature extraction layer and a first residual network (the specific calculation process includes addition and normalization (Add & Norm)), wherein an input of the first feature extraction layer includes the knowledge fusion vectors, and an input of the first residual network includes the knowledge fusion vectors and an output of the first feature extraction layer.

The natural language processing model can further include:

a first feedforward neural network layer and a second residual network, wherein an input of the first feedforward neural network layer includes an output of a first module, and an input of the second residual network includes an output of the first feedforward neural network layer and an output of the first module.

In one embodiment, positional encodings of the tokens in the sample text can also be determined, and then positional encoding features and the knowledge fusion vectors are added and input into the first feature extraction layer.

In another embodiment, the knowledge fusion vectors input into the first feature extraction layer may not include the positional encodings, and a sequential encoding matrix can be set in the first feature extraction layer to supplement position information. The sequential encoding matrix consists of an upper triangular matrix and a lower triangular matrix, wherein the upper triangular matrix is different from the lower triangular matrix, and a value of any element in the sequential encoding matrix is not 0. In one embodiment, values of respective elements in the upper triangular matrix of the sequential encoding matrix are the same, and values of respective elements in the lower triangular matrix are the same. Further, the values of respective elements in the upper triangular matrix can be 1 or −1, and the values of respective elements in the lower triangular matrix can be −1 or 1. The sequential encoding matrix can be located between the association matrix and the weight matrix (which can play the role of the positional encoding), for example, the association matrix is multiplied with the sequential encoding matrix, so as to obtain the position information. The model can learn relative position information of the sample text and sequential relation information between one or more entities with the sample text through the upper triangular matrix and the lower triangular matrix in the sequential encoding matrix, thereby improving the training effect of the model.

Figure 22B:
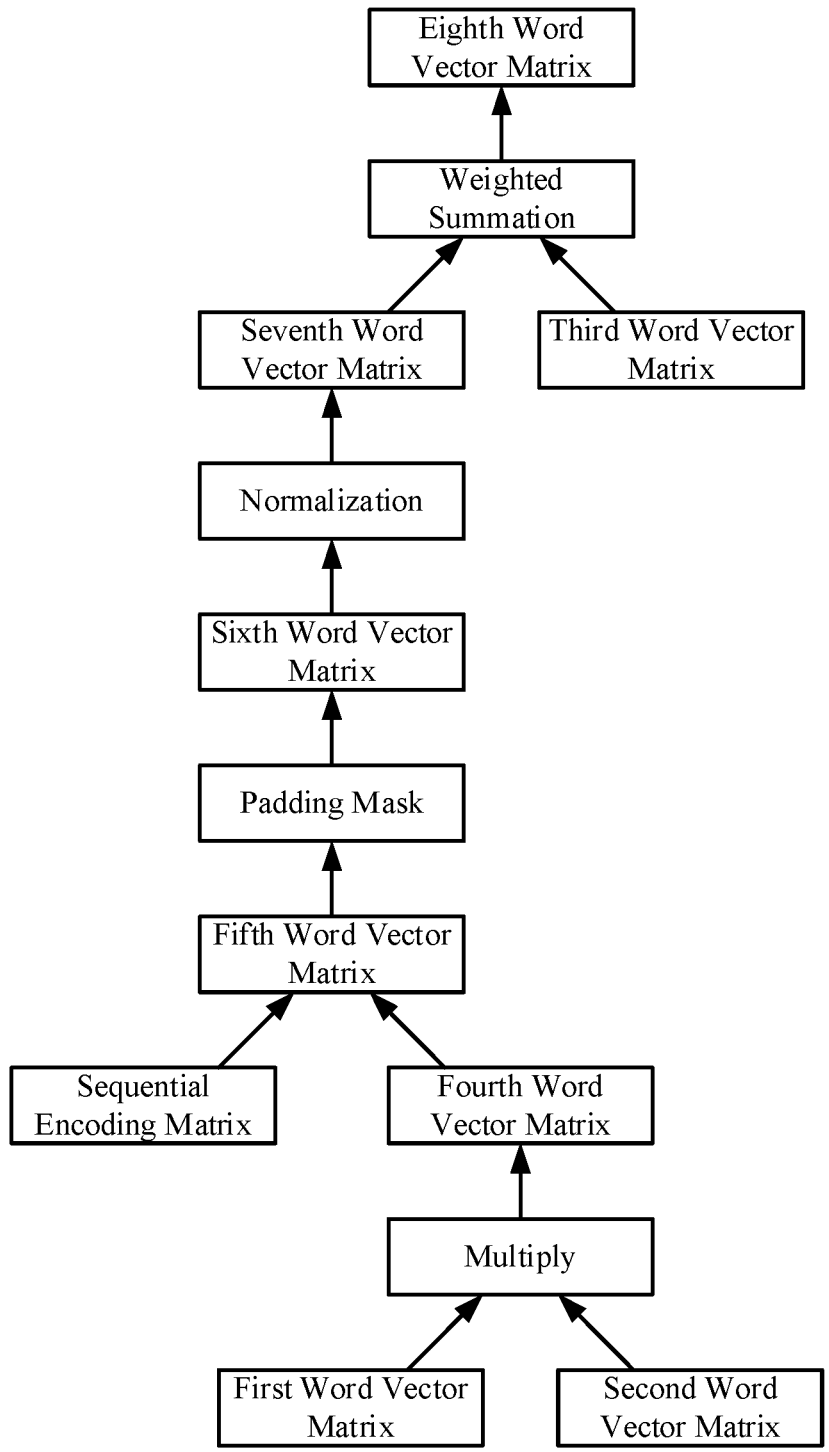
FIG. 22B is a schematic diagram illustrating a calculation process of a first feature extraction layer according to an embodiment of the present disclosure.

FIG. 22B is a schematic diagram illustrating a calculation process of a first feature extraction layer according to an embodiment of the present disclosure.

As shown in FIG. 22B, from the point of view of calculation process, the function of the first feature extraction layer can be described as follows:

the knowledge embedding vectors are multiplied with the training matrix to obtain a first word vector matrix, a second word vector matrix and a third word vector matrix;

the first word vector matrix is multiplied with the second word vector matrix to obtain a fourth word vector matrix;

the fourth word vector matrix is encoded through the sequential encoding matrix to obtain a fifth word vector matrix;

padding mask is performed on the fifth word vector matrix to obtain a sixth word vector matrix;

the sixth word vector matrix is normalized to obtain a seventh word vector matrix; and weighted summation is performed on the third word vector matrix based on the seventh word vector matrix to obtain the eighth word vector matrix.

In one embodiment, after receiving the knowledge fusion vectors, the first feature extraction layer can repeat the functions of the first feature extraction layer, the first residual network, the first feedforward neural network layer and the second residual network for many times, and then output the results.

Figure 23:
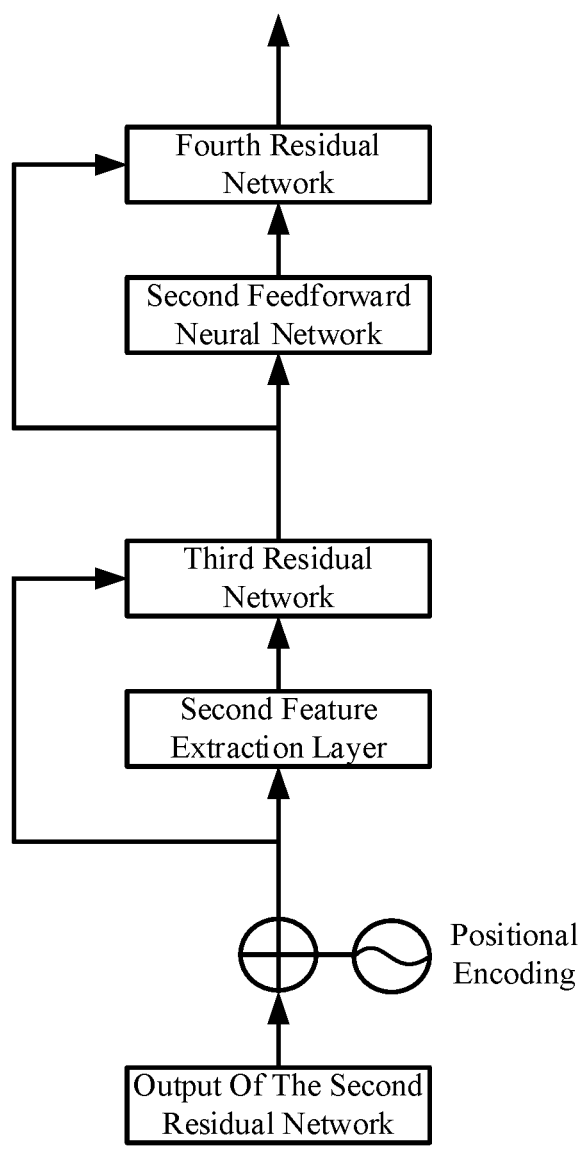
FIG. 23 is a schematic structural diagram illustrating a first submodel according to an embodiment of the present disclosure.
Figure 24:
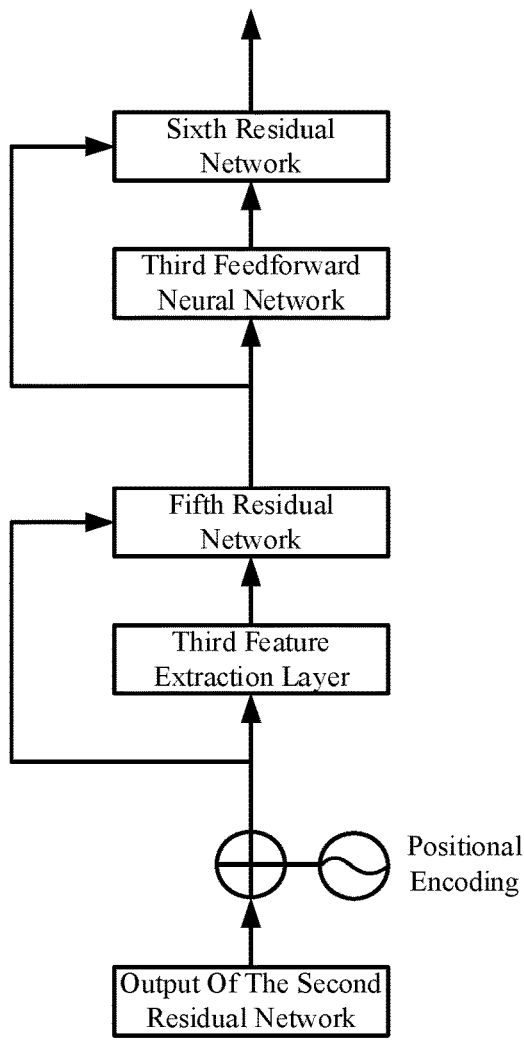
FIG. 24 is a schematic structural diagram illustrating a second submodel according to an embodiment of the present disclosure.

FIG. 23 is a schematic structural diagram illustrating a first submodel according to an embodiment of the present disclosure. FIG. 24 is a schematic structural diagram illustrating a second submodel according to an embodiment of the present disclosure.

In one embodiment, the natural language processing model includes a first submodel and/or a second submodel.

As shown in FIG. 23, the first submodel includes:

the second feature extraction layer and a third residual network, wherein the input of the second feature extraction layer includes the output of the second residual network, and an input of the third residual network includes the output of the second residual network and the output of the third feature extraction layer; and a second feedforward neural network layer and a fourth residual network, wherein an input of the second feedforward neural network layer includes an output of the third residual network, and an input of the fourth residual network includes an output of the second feedforward neural network layer and the output of the third residual network.

In one embodiment, positional encodings of the tokens in the sample text can also be determined, and then added embedding vectors obtained by adding positional encoding features and the output of the first feature extraction layer are input into the first submodel.

In one embodiment, after receiving the knowledge fusion vectors, the first submodel can repeat the functions of the second feature extraction layer, the third residual network, the second feedforward neural network layer and the fourth residual network for many times, and then output the results.

As shown in FIG. 24, the second submodel includes:

the third feature extraction layer and a fifth residual network, wherein the input of the third feature extraction layer includes the output of the second residual network, and an input of the fifth residual network includes the output of the second residual network and the output of the third feature extraction layer; and a third feedforward neural network layer and a sixth residual network, wherein an input of the third feedforward neural network layer includes an output of the fifth residual network, and an input of the sixth residual network includes an output of the third feedforward neural network layer and the output of the fifth residual network.

In one embodiment, positional encodings of the tokens in the sample text can also be determined, and then added embedding vectors obtained by adding positional encoding features and the output of the first feature extraction layer are input into the second submodel.

In one embodiment, after receiving the knowledge fusion vectors, the second submodel can repeat the functions of the third feature extraction layer, the fifth residual network, the third feedforward neural network layer and the sixth residual network for many times, and then output the results.

In one embodiment, if the training task is the generation task, freezing the second feature extraction layer; and if the training task is the semantic understanding task, freezing the third feature extraction layers can specifically refer to:

if the training task is the generation task, freezing the first submodel; and if the training task is the semantic understanding task, freezing the second submodel.

The method for training the natural language processing model provided by the embodiments of the present disclosure relates to the processing of natural language texts, and can be specifically applied to data processing methods such as data training, machine learning, and deep learning. Symbolized and formalized intelligent information modeling, extraction, preprocessing, training, and the like are performed on training data (for example, the sample text and initial knowledge fusion vectors in the present disclosure); and finally obtain a trained natural language processing model.

Moreover, the text processing method provided by the embodiments of the present disclosure can use the trained natural language processing model, and input data (for example, texts to be processed in the present disclosure) can be input into the trained natural language processing model to obtain output data (for example, the processing result corresponding to the target task in the present disclosure).

It should be noted that the method for training the natural language processing model and the text processing method provided by the embodiments of the present disclosure are inventions generated based on a same concept, or may be understood as two parts of a system or two phases of an entire process, for example, a model training phase and a model application phase.

The embodiments of the present disclosure further provides a text processing method, including:

obtaining a target text;
determining one or more triples in the target text, wherein each of the triples includes two entities in the target text and a relation between the two entities;
processing the target text based on the triples to obtain one or more knowledge fusion vectors; and
inputting the knowledge fusion vectors into a target model (for example, the target model in the method described in any of the above embodiments) to obtain a processing result of processing the target text.

The processing result includes at least one of the following information: translation information of text data, reply information of the text data, classification information of the text data, or association relation information between the text data and other reference text data.

In one embodiment, processing the target text based on the triples to obtain the knowledge fusion vectors includes: fusing the target text and the triples in the target text to obtain the knowledge fusion vectors.

In one embodiment, inputting the knowledge fusion vectors into the target model to obtain the processing result of processing the target text includes:

inserting the triples in the target text into the target text to obtain the knowledge fusion vectors.

In one embodiment, inputting the knowledge fusion vectors into the target model to obtain the processing result of processing the target text includes:

determining one or more text embedding vectors corresponding to the target text;
determining one or more knowledge embedding vectors corresponding to the triples; and
fusing the text embedding vectors and the knowledge embedding vectors to obtain the knowledge fusion vectors.

In one embodiment, the target model includes one or more feature extraction layers configured to:

perform linear transformation on the knowledge fusion vectors to obtain at least two knowledge fusion matrices including a first knowledge fusion matrix and a second knowledge fusion matrix;
determine an association matrix according to the first knowledge fusion matrix, wherein the association matrix is configured to represent association relation information between one or more entities in the target text with the target text; and
determine a weight matrix according to the second knowledge fusion matrix and the association matrix, wherein the weight matrix is configured to represent weight information between the entities with the target text.

In one embodiment, the feature extraction layers at least include a first feature extraction layer and a second feature extraction layer, wherein a dimension of the association matrix in the second feature extraction layer is variable relative to a dimension of the weight matrix in the first feature extraction layer.

In one embodiment, the feature extraction layers further include one or more third feature extraction layers, wherein the third feature extraction layers include a masking matrix, and the masking matrix is configured to partially mask the association matrix.

A text processing apparatus, including a processor configured to:

obtain a target text;
determine one or more triples in the target text, wherein each of the triples includes two entities in the target text and a relation between the two entities;
process the target text based on the triples to obtain one or more knowledge fusion vectors; and
input the knowledge fusion vectors into a target model to obtain a processing result of processing the target text.

In one embodiment, the apparatus can include, but not limited to, terminals and servers. The terminals can include, but not limited to, electronic devices such as mobile phones, tablet computers, wearable devices, personal computers, and Internet of Things devices; and the servers can include, but not limited to, local servers and cloud servers.

In one embodiment, the processor is configured to fuse the target text and the triples in the target text to obtain the knowledge fusion vectors.

In one embodiment, the processor is configured to insert the triples in the target text into the target text to obtain the knowledge fusion vectors.

In one embodiment, the processor is configured to determine one or more text embedding vectors corresponding to the target text; determine one or more knowledge embedding vectors corresponding to the triples; and fuse the text embedding vectors and the knowledge embedding vectors to obtain the knowledge fusion vectors.

In one embodiment, the target model includes one or more feature extraction layers configured to:

perform linear transformation on the knowledge fusion vectors to obtain at least two knowledge fusion matrices including a first knowledge fusion matrix and a second knowledge fusion matrix;
determine an association matrix according to the first knowledge fusion matrix, wherein the association matrix is configured to represent association relation information between one or more entities in the target text with the target text; and determine a weight matrix according to the second knowledge fusion matrix and the association matrix, wherein the weight matrix is configured to represent weight information between the entities with the target text.

In one embodiment, the feature extraction layers at least include a first feature extraction layer and a second feature extraction layer, wherein a dimension of the association matrix in the second feature extraction layer is variable relative to a dimension of the weight matrix in the first feature extraction layer.

In one embodiment, the feature extraction layers further include one or more third feature extraction layers, wherein the third feature extraction layers include a masking matrix, and the masking matrix is configured to partially mask the association matrix.

After obtaining the target model based on the method described in the above embodiment, the apparatus can store the target model, and then subsequently process the input target text by using the target model. For example, the processing for the target text can include, but not limited to, at least one of:

semantic understanding, for example, semantics of the target text can be generated;

translation, for example, corresponding contents of the target text in other languages can be generated;

prediction generation, for example, contents that will appear after the target text can be predicted, and the predicted content can be displayed;

word order adjustment, for example, a word order of the target text can be adjusted to a correct word order.

In one embodiment, after obtaining the target model, the fine-tune model can be further trained, and the overall model can be obtained through the target model and the fine-tune model. An output of the overall model includes at least one of the following information: translation information of text data, reply information of the text data, classification information of the text data (for example, emotion classification, and the like), or association relation information between the text data and other reference text data. Different information can be output by the overall model by training different fine-tune models.

In one embodiment, the apparatus further includes:

an interaction module configured to determine according an operation of a user whether the triples in the target text are obtained based on a knowledge graph, wherein in response to determining that the triples in the target text are obtained based on the knowledge graph, determining one or more triples corresponding to the target text in the knowledge graph; and in response to determining that the triples in the target text are not obtained based on the knowledge graph, determining one or more triples in the target text.

Figure 25:
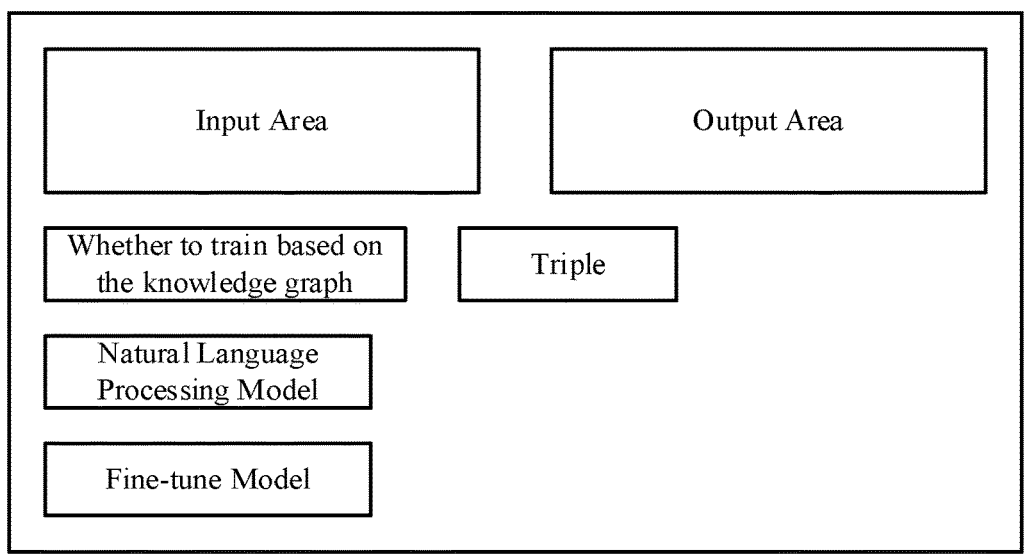
FIG. 25 is a schematic diagram illustrating an interaction according to an embodiment of the present disclosure.

FIG. 25 is a schematic diagram illustrating an interaction according to an embodiment of the present disclosure.

As shown in FIG. 25, for example, the interaction module includes a screen integrated with a touch function. An input area and an output area are displayed in the screen, so that a user can input a target text in the input area, and after the target text is processed by the target model, the processing result can be displayed in the output area.

In one embodiment, the interaction module is further configured to display the triples corresponding to the target text in the knowledge graph;

wherein, in response to determining that the target model is trained based on the knowledge graph, one or more triples corresponding to the target text in the knowledge graph are determined;

in response to determining that the target model is not trained based on the knowledge graph, one or more triples in the target text are determined.

In one embodiment, the user can also operate on the interaction module to control the process of training the natural language processing model. For example, one or more options can be provided in the screen for the user to determine whether to train the target model based on the knowledge graph.

If the user selects to train the target model based on the knowledge graph, the triples corresponding to the target text in the knowledge graph can be determined; and if the user selects not to train the target model based on the knowledge graph, the triples in the target text can be determined directly without considering the knowledge graph.

In one embodiment, the interaction module is further configured to, in response to determining that the target model is trained based on the knowledge graph, display the triples corresponding to the target text in the knowledge graph; and adjust the displayed triples according to the operation of the user to obtain one or more adjusted triples, and take the adjusted triples as the triples corresponding to the target text in the knowledge graph.

In one embodiment, the interaction module can further display the determined triples, and the user can independently determine whether the triples are reasonable. If the triples are unreasonable, the user can adjust the displayed triples, and the interaction module can take the adjusted triples as the corresponding triples of the target text in the knowledge graph.

In one embodiment, the interaction module is further configured to, in response to determining that the target model is trained based on the knowledge graph, receive one or more triples input by the user as the triples corresponding to the target text in the knowledge graph. That is, the user can directly input the triples as the triples corresponding to the target text in the knowledge graph as required.

In one embodiment, the interaction module is further configured to select the target model according to the operation of the user, wherein the target model includes at least one of:

a convolutional neural network (CNN), a recurrent neural network (RNN), a gated recurrent unit (GRU), a long short-term memory (LSTM), a Transformer, or a Transformer-XL.

The user can operate on the interaction module to select a type of target model. For example, types of the above target model can be displayed in a drop-down menu, and the user can select one of the types for training.

In one embodiment, the target model includes the Transformer and/or the Transformer-XL, the interaction module is further configured to determine a fine-tune model according to the operation of the user.

The natural language processing model includes the Transformer and/or the Transformer-XL, the process of training the natural language processing model is mainly the pretraining, and then fine-tune models can be added for training according to specific tasks. In this case, the user can operate on the interaction module to select the type of fine-tune model. For example, types of several fine-tune models can be displayed in the drop-down menu, and the user can select one of the types for training.

In one embodiment, the fine-tune model includes at least one of:

the CNN, the RNN, the GRU, or the LSTM.

According to the embodiments of the present disclosure, there is provided a computer readable storage medium storing computer programs thereon, where the computer programs, when executed by one or more processors, causing the processors to implement the steps of the method for training the natural language processing model described in any one of the above embodiments and/or the steps of the text processing method described in any one of the above embodiments.

Figure 26:
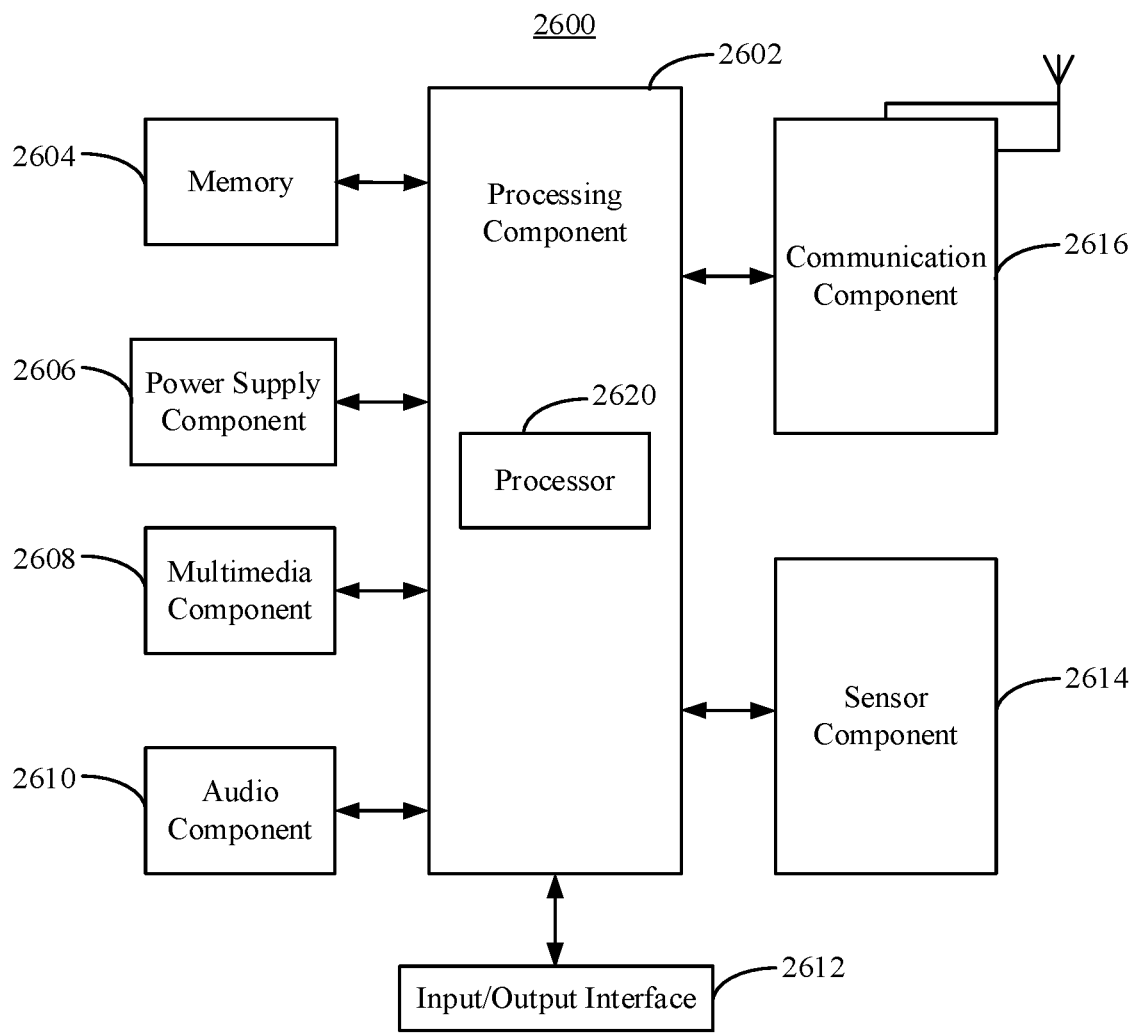
FIG. 26 is a schematic block diagram illustrating an apparatus for training a natural language processing model according to an embodiment of the present disclosure.

FIG. 26 is a schematic block diagram illustrating an apparatus 2600 for training a natural language processing model according to an embodiment of the present disclosure. For example, the apparatus 2600 can be a terminal, for example, a mobile telephone, a computer, a digital broadcasting terminal, a message receiving and transmitting device, a game console, a tablet device, a medical device, a fitness device, a personal digital assistant, and the like; or can also be a server.

Referring to FIG. 26, the apparatus 2600 may include one or more of the following components: a processing component 2602, a memory 2604, a power supply component 2606, a multimedia component 2608, an audio component 2610, an input/output (I/O) interface 2612, a sensor component 2614 and a communication component 2616.

The processing component 2602 generally controls overall operations of the apparatus 2600, such as operations associated with display, phone calls, data communications, camera operations, and recording operations. The processing component 2602 may include one or more processors 2620 to execute instructions to complete all or part of the steps of the above methods. In addition, the processing component 2602 may include one or more modules which facilitate the interaction between the processing component 2602 and other components. For example, the processing component 2602 may include a multimedia module to facilitate the interaction between the multimedia component 2608 and the processing component 2602.

The memory 2604 is to store various types of data to support the operation of the apparatus 2600. Examples of such data include instructions for any application or method operated on the apparatus 2600, contact data, phonebook data, messages, pictures, videos, and so on. The memory 2604 may be implemented by any type of volatile or non-volatile storage devices or a combination thereof, such as a Static Random-Access Memory (SRAM), an Electrically-Erasable Programmable Read Only Memory (EEPROM), an Erasable Programmable Read Only Memory (EPROM), a Programmable read-only memory (PROM), a Read Only Memory (ROM), a magnetic memory, a flash memory, a magnetic or optical disk.

The power supply component 2606 provides power to different components of the apparatus 2600. The power supply component 2606 may include a power management system, one or more power supplies, and other components associated with generating, managing, and distributing power for the apparatus 2600.

The multimedia component 2608 includes a screen providing an output interface between the apparatus 2600 and a user. In some embodiments, the screen may include a Liquid Crystal Display (LCD) and a Touch Panel (TP). If the screen includes the TP, the screen may be implemented as a touch screen to receive input signals from the user. The TP may include one or more touch sensors to sense touches, swipes, and gestures on the TP. The touch sensors may not only sense a boundary of a touch or swipe, but also sense duration and a pressure associated with the touch or swipe. In some embodiments, the multimedia component 2608 may include a front camera and/or a rear camera. The front camera and/or rear camera may receive external multimedia data when the apparatus 2600 is in an operating mode, such as a photographing mode or a video mode. Each of the front camera and the rear camera may be a fixed optical lens system or have focal length and optical zooming capability.

The audio component 2610 is configured to output and/or input an audio signal. For example, the audio component 2610 includes a microphone (MIC). When the apparatus 2600 is in an operating mode, such as a call mode, a recording mode, and a voice recognition mode, the MIC is to receive an external audio signal. The received audio signal may be further stored in the memory 2604 or transmitted via the communication component 2626. In some embodiments, the audio component 2610 further includes a speaker to output an audio signal.

The I/O interface 2612 may provide an interface between the processing component 2602 and peripheral interface modules. The above peripheral interface modules may include a keyboard, a click wheel, buttons and so on. These buttons may include, but not limited to, a home button, a volume button, a starting button and a locking button.

The sensor component 2614 includes one or more sensors to provide status assessments of various aspects for the apparatus 2600. For example, the sensor component 2614 may detect the on/off status of the apparatus 2600, and relative positioning of component, for example, the component is a display and a keypad of the apparatus 2600. The sensor component 2614 may also detect a change in position of the apparatus 2600 or a component of the apparatus 2600, a presence or absence of the contact between a user and the apparatus 2600, an orientation or an acceleration/deceleration of the apparatus 2600, and a change in temperature of the apparatus 2600. The sensor component 2614 may include a proximity sensor to detect the presence of a nearby object without any physical contact. The sensor component 2614 may further include an optical sensor, such as a Complementary Metal Oxide Semiconductor (CMOS) or Charge-coupled Device (CCD) image sensor which is used in imaging applications. In some embodiments, the sensor component 2614 may further include an acceleration sensor, a gyroscope sensor, a magnetic sensor, a pressure sensor, or a temperature sensor.

The communication component 2616 is to facilitate wired or wireless communication between the apparatus 2600 and other devices. The apparatus 2600 may access a wireless network that is based on a communication standard, such as Wi-Fi, 2G or 3G, or a combination thereof. In an exemplary embodiment, the communication component 2616 receives a broadcast signal or broadcast-associated information from an external broadcast management system via a broadcast channel. In an exemplary embodiment, the communication component 2616 further includes a Near Field Communication (NFC) module to facilitate short-range communications. For example, the NFC module may be implemented based on a Radio Frequency Identification (RFID) technology, an Infrared Data Association (IrDA) technology, an Ultra-Wide Band (UWB) technology, a Blue Tooth (BT) technology and other technologies.

In an exemplary embodiment, the apparatus 2600 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, microcontrollers, microprocessors, or other electronic components for performing the above method.

In an exemplary embodiment, there is also provided a non-transitory computer readable storage medium including instructions, such as the memory 2604 including instructions. The instructions may be executed by the processor 2620 of the apparatus 2600 to perform the above described methods. For example, the non-transitory computer readable storage medium may be a ROM, a Random Access Memory (RAM), a CD-ROM, a magnetic tape, a floppy disk, an optical data storage device, and the like.

Other implementations of the present disclosure will be apparent to those skilled in the art from consideration of the specification and practice of the present disclosure herein. The present disclosure is intended to cover any variations, uses, modification or adaptations of the present disclosure that follow the general principles thereof and include common knowledge or conventional technical means in the art that are not disclosed in the present disclosure. The specification and examples are considered as exemplary only, with a true scope and spirit of the present disclosure being indicated by the following claims.

It should be understood that the present disclosure is not limited to the above described structures shown in the drawings, and various modifications and changes can be made to the present disclosure without departing from the scope thereof. The scope of the present disclosure is to be limited only by the appended claims.

It should be noted that the relational terms such as "first" and "second" used herein are merely intended to distinguish one entity or operation from another entity or operation rather than to require or imply any such actual relation or order existing between these entities or operations. Also, the terms "including", "containing", or any variation thereof is intended to cover non-exclusive inclusion, so that a process, method, article, or device including a series of elements includes not only those elements but also other elements not listed explicitly or those elements inherent to such a process, method, article, or device. Without more limitations, an element defined by the statement "including a . . . " shall not be precluded to include additional same elements present in the process, method, article or device including the elements.

The methods and apparatuses provided by the embodiments of the present disclosure have been described in detail above. Specific examples are used herein to explain the principles and implementations of the present disclosure. The description of the above embodiments is only used to help understand methods and core ideas in the present disclosure. At the same time, those of ordinary skill in the art can apply some changes in the specific implementation and the scope of application based on the idea of the present disclosure. In conclusion, the content of the present specification should not be construed as any limitation to the present disclosure.

The invention claimed is:

1. A method, comprising:
obtaining a sample text of natural language;
determining one or more triples in the sample text, wherein each of the triples comprises two entities in the sample text and a relation between the two entities;
processing the sample text based on the triples to obtain one or more knowledge fusion vectors; and
training a natural language processing model by inputting the knowledge fusion vectors into the natural language processing model to obtain a target model;
wherein the natural language processing model comprises one or more feature extraction layers configured to:
perform linear transformation on the knowledge fusion vectors to obtain at least two knowledge fusion matrices comprising a first knowledge fusion matrix and a second knowledge fusion matrix;
determine an association matrix according to the first knowledge fusion matrix, wherein the association matrix is configured to represent association relation information between one or more entities in the sample text with the sample text; and
determine a weight matrix according to the second knowledge fusion matrix and the association matrix, wherein the weight matrix is configured to represent weight information between the entities with the sample text.

2. The method according to claim 1, wherein
training the natural language processing model by inputting the knowledge fusion vectors into the natural language processing model to obtain the target model comprises:
constructing one or more pretraining tasks, and training the natural language processing model according to the pretraining tasks to obtain the target model;
wherein determining the one or more triples in the sample text comprises:
determining one or more triples in a knowledge graph and corresponding to the sample text, or obtaining the one or more triples in the sample text based on a triple extraction model, wherein the knowledge graph comprises at least one of a preconstructed knowledge graph or a prestored knowledge graph;
processing the sample text based on the triples to obtain one or more knowledge fusion vectors comprises:
fusing the sample text and the triples in the sample text to obtain the knowledge fusion vectors.

3. The method according to claim 2, wherein the pretraining tasks comprises:
a first pretraining task, wherein the first pretraining task comprises a masking task, and the masking task comprises performing masking on the sample text based on each of the triples to obtain the knowledge fusion vectors;
a second pretraining task, wherein the second pretraining task is used to split a sample document into one or more segments level by level according to one or more levels of granularity, randomly arrange split segments after each level of splitting and combine rearranged samples; and perform training based on the rearranged samples to output relation types between sentences in the rearranged samples;
a third pretraining task, wherein the third pretraining task is used to perform semantic recognition training after performing masking on tokens corresponding to the triples in the sample text; or
any combination of the first pretraining task, the second pretraining task and the third pretraining task.

4. The method according to claim 3, wherein performing masking on the sample text based on each of the triples to obtain the knowledge fusion vectors comprises at least one of:
performing masking on the tokens corresponding to the triples in the sample text to obtain a knowledge fusion vector; or
dividing the sample text according to the tokens corresponding to the triples in the knowledge graph to obtain a plurality of subtexts, and performing masking on the subtexts to obtain the knowledge fusion vector.

5. The method according to claim 4, wherein performing masking on the tokens corresponding to the triple in the sample text to obtain the knowledge fusion vector comprises:
performing masking on the tokens corresponding to the entities and the relation within the triple in the sample text to obtain the knowledge fusion vector;
dividing the sample text according to the tokens corresponding to the triples in the knowledge graph to obtain the plurality of subtexts comprises:
dividing the sample text at a beginning or an end of the tokens corresponding to the triples to obtain the plurality of subtexts;
performing masking on the subtexts to obtain the knowledge fusion vector comprises:
performing masking on the tokens corresponding to the triples in the subtexts to obtain the knowledge fusion vector.

6. The method according to claim 4, wherein, when the sample text comprises n triples,
dividing the sample text according to the tokens corresponding to the triples in the knowledge graph to obtain the plurality of subtexts comprises:
dividing the sample text according to the tokens corresponding to a $m^{th}$ triple in the n triples to obtain the plurality of subtexts, wherein n is an integer greater than 1, and m is a positive integer less than or equal to n;
dividing the sample text according to the tokens corresponding to the triples to obtain the plurality of subtexts, and performing masking on the tokens corresponding to the triples in the sample text to obtain the knowledge fusion vector comprises:
from i=1 to i=n, iteratively performing following steps:
dividing the sample text according to the tokens corresponding to an $i^{th}$ triple in the n triples to obtain an $i^{th}$ subtext group consisting of a plurality of subtexts corresponding to the $i^{th}$ triple; and
performing masking on the tokens corresponding to the $i^{th}$ triple in the $i^{th}$ subtext group to obtain the knowledge fusion vector, wherein n is an integer greater than 1 and i is a positive integer less than or equal to n.

7. The method according to claim 6, wherein
taking a training after performing masking on the tokens corresponding to the $i^{th}$ triple in the $i^{th}$ subtext group as an epoch of training, and
performing k epochs of training, wherein k is an integer greater than or equal to n.

8. The method according to claim 2, wherein determining the triples corresponding to the sample text in the knowledge graph comprises at least one of:
determining a field to which the sample text belongs;
determining the knowledge graph of the field; and
determining the triples corresponding to the sample text in the knowledge graph of the field; or
determining a plurality of subknowledge graphs;
merging entities with the same semantics in different subknowledge graphs to obtain a merged knowledge graph; and
determining one or more triples corresponding to the sample text in the merged knowledge graph.

9. The method according to claim 8, wherein merging the entities with the same semantics in different subknowledge graphs comprises:
calculating one or more distances between embedding vectors corresponding to any two entities in different subknowledge graphs according to structural feature vectors $h_s$ and attribute feature vectors $h_a$ corresponding to the two entities; and
when the distances are less than a distance threshold, merging the two entities,
wherein the structural feature vector $h_s$ and the attribute feature vector $h_a$ of each entity are calculated by using a graph convolutional network (GCN) model based on structural feature vector $h_{s-1}$ and attribute feature vector $h_{a-1}$ of a previous entity of the entity and a connectivity matrix A.

10. The method according to claim 2, wherein the knowledge graph comprises the preconstructed knowledge graph, before determining the triples corresponding to the sample text in the knowledge graph, the method further comprises:
determining the triple extraction model, wherein the triple extraction model is configured to extract triples from the sample text; and
constructing the knowledge graph according to the extracted triples,
wherein the triple extraction model comprises:
a label determination model configured to determine one or more labels of tokens in the sample text, wherein the labels are configured to determine entities in the sample text; and
a relation determination model configured to determine at least one of a relation between at least two entities determined by the label determination model or a position of the relation in the sample text.

11. The method according to claim 2, wherein training the natural language processing model according to the pretraining tasks to obtain the target model comprises at least one of:
performing at least one epoch of following steps:
selecting and adding the pretraining tasks according to a preset order to obtain an added pretraining task; and
training the natural language processing model according to the added pretraining task after each time a pretraining task is selected; or
randomly selecting and adding the pretraining tasks to obtain an added pretraining task, and training the natural language processing model according to the added pretraining task after each time a pretraining task is selected, wherein a learning rate of training the natural language processing model is positively correlated with a batch size of samples input into the natural language processing model during each training.

12. The method according to claim 2, wherein fusing the sample text and the triples in the sample text to obtain the knowledge fusion vectors comprises at least one of:
inserting the triples in the sample text into the sample text to obtain the knowledge fusion vectors; or
determining one or more text embedding vectors corresponding to the sample text;
determining one or more knowledge embedding vectors corresponding to the triples; and
fusing the text embedding vectors and the knowledge embedding vectors to obtain the knowledge fusion vectors,
wherein the triples comprise at least one of a head entity, a relation, or a tail entity;
the text embedding vectors comprise at least one of one or more sentence embedding vectors, one or more position embedding vectors corresponding to tokens of the triples, or one or more task type embedding vectors.

13. The method according to claim 12, wherein determining the knowledge embedding vectors corresponding to the triples comprises:
fusing one or more embedding vectors of the head entity, one or more embedding vectors of the relation and one or more embedding vectors of the tail entity to obtain the knowledge embedding vectors:

$$e_k = concat(h_e + r_e + t_e);$$

wherein $e_k$ represents the knowledge embedding vectors, $h_e$ represents the embedding vectors of the head entity, $r_e$ represents the embedding vectors of the relation, $t_e$ represents the embedding vectors of the tail entity, and concat( ) represents a splicing function.

14. The method according to claim 12, wherein fusing the text embedding vectors and the knowledge embedding vectors comprises at least one of:
performing feature extraction on the text embedding vectors through one or more feature extraction layers to obtain one or more text feature vectors;
performing feature extraction on the knowledge embedding vectors through one or more feature extraction layers to obtain one or more knowledge feature vectors; and
fusing the text feature vectors and the knowledge feature vectors through a multi-layer perceptron layer to obtain the knowledge fusion vectors; or
fusing the text embedding vectors and the knowledge embedding vectors by using a knowledge fusion model:

$$f_i = \sigma(W_t^i e_t^i + W_e^i e_k^i + b_i);$$

wherein $f_i$ represents the knowledge fusion vectors, $e_t$ represents the text embedding vectors, $e_k$ represents the knowledge embedding vectors, $W_t$ represents a weight of the text embedding vectors, $W_e$ represents a weight of the knowledge embedding vectors, b represents a bias, and i represents the $i^{th}$ token in the corresponding sample text.

15. The method according to claim 1, wherein a relation between a learning rate of training the natural language processing model and a batch size of samples input into the natural language processing model during each training is as follows:

$$Y = 5.57e^{-6} \cdot \log_2 X - 4.75e^{-6},$$

wherein X represents the batch size of samples input into the natural language processing model during each training, and Y represents the learning rate.

16. The method according to claim 1, wherein the feature extraction layers at least comprise a first feature extraction layer and a second feature extraction layer, wherein a dimension of the association matrix in the second feature extraction layer is variable relative to a dimension of the weight matrix in the first feature extraction layer.

17. The method according to claim 16, wherein the feature extraction layers further comprise one or more third feature extraction layers, wherein the third feature extraction layers comprise a masking matrix, and the masking matrix is configured to partially mask the association matrix, wherein the third feature extraction layers are located after the first feature extraction layer.

18. A method, comprising:
obtaining a target text;
determining one or more triples in the target text, wherein each of the triples comprises two entities in the target text and a relation between the two entities;
processing the target text based on the triples to obtain one or more knowledge fusion vectors; and
inputting the knowledge fusion vectors into a target model to obtain a processing result of processing the target text;
wherein the target model comprises one or more feature extraction layers configured to:
perform linear transformation on the knowledge fusion vectors to obtain at least two knowledge fusion matrices comprising a first knowledge fusion matrix and a second knowledge fusion matrix;
determine an association matrix according to the first knowledge fusion matrix, wherein the association matrix is configured to represent association relation information between one or more entities in the target text with the target text; and
determine a weight matrix according to the second knowledge fusion matrix and the association matrix, wherein the weight matrix is configured to represent weight information between the entities with the target text.

19. An apparatus, comprising a processor configured to:
obtain a target text;
determine one or more triples in the target text, wherein each of the triples comprises two entities in the target text and a relation between the two entities;
process the target text based on the triples to obtain one or more knowledge fusion vectors; and
input the knowledge fusion vectors into a target model to obtain a processing result of processing the target text;
wherein the target model comprises one or more feature extraction layers configured to:
perform linear transformation on the knowledge fusion vectors to obtain at least two knowledge fusion matrices comprising a first knowledge fusion matrix and a second knowledge fusion matrix;
determine an association matrix according to the first knowledge fusion matrix, wherein the association matrix is configured to represent association relation information between one or more entities in the target text with the target text; and
determine a weight matrix according to the second knowledge fusion matrix and the association matrix, wherein the weight matrix is configured to represent weight information between the entities with the target text.

* * * * *